(12) United States Patent
Murata et al.

(10) Patent No.: US 10,742,584 B2
(45) Date of Patent: Aug. 11, 2020

(54) EMAIL-TRANSMISSION SETTING DEVICE, EMAIL-TRANSMISSION SETTING METHOD, PROGRAM FOR EMAIL-TRANSMISSION SETTING DEVICE, AND STORAGE MEDIUM

(71) Applicant: Rakuten, Inc., Tokyo (JP)

(72) Inventors: Yusuke Murata, Tokyo (JP); Kenjiro Numazu, Tokyo (JP); Ruka Sakurai, Tokyo (JP)

(73) Assignee: Rakuten, Inc., Tokyo (JP)

( * ) Notice: Subject to any disclaimer, the term of this patent is extended or adjusted under 35 U.S.C. 154(b) by 206 days.

(21) Appl. No.: 15/025,695

(22) PCT Filed: Sep. 30, 2013

(86) PCT No.: PCT/JP2013/076612
§ 371 (c)(1),
(2) Date: Mar. 29, 2016

(87) PCT Pub. No.: WO2015/045178
PCT Pub. Date: Apr. 2, 2015

(65) Prior Publication Data
US 2016/0301647 A1 Oct. 13, 2016

(51) Int. Cl.
*H04L 12/58* (2006.01)
*G06F 13/38* (2006.01)
*H04L 29/08* (2006.01)

(52) U.S. Cl.
CPC ............ *H04L 51/22* (2013.01); *G06F 13/385* (2013.01); *H04L 51/063* (2013.01); *H04L 51/26* (2013.01); *H04L 67/1002* (2013.01)

(58) Field of Classification Search
CPC ... H04L 51/22; H04L 51/063; H04L 67/1002; G06F 13/385
(Continued)

(56) References Cited

U.S. PATENT DOCUMENTS

2003/0046421 A1* 3/2003 Horvitz ............... G06Q 10/107
709/238
2006/0010215 A1* 1/2006 Clegg ................. G06Q 10/107
709/206

(Continued)

FOREIGN PATENT DOCUMENTS

JP 11-177613 A 7/1999

*Primary Examiner* — Umar Cheema
*Assistant Examiner* — Tony Williams
(74) *Attorney, Agent, or Firm* — Sughrue Mion, PLLC

(57) ABSTRACT

A plurality of pieces of send candidate information are stored (S12). Each piece of send candidate information has sender identification information identifying a sender of an email, recipient identification information identifying a recipient of the email, item identification information (52b and 52c), item information that are associated with each other. The item information includes element values of one or more elements. From among the stored pieces of send candidate information, two or more pieces of send candidate information that have different pieces of sender identification information, the same recipient identification information, and related pieces of item identification information are extracted (S13). The element values included in the pieces of item information of the two or more extracted pieces of send candidate information are compared, and timings for sending emails corresponding to the two or more extracted pieces of send candidate information are set to at least two different timings, based on the comparison result (S14, S15, and S16).

21 Claims, 16 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2006/0059238 A1* | 3/2006 | Slater | G06Q 10/107 709/206 |
| 2007/0061403 A1* | 3/2007 | Seaburg | H04L 51/14 709/206 |
| 2008/0126951 A1* | 5/2008 | Sood | G06Q 10/107 715/752 |
| 2009/0125602 A1* | 5/2009 | Bhatia | G06Q 10/107 709/207 |
| 2009/0254629 A1* | 10/2009 | Bruce | G06Q 10/107 709/207 |
| 2011/0183627 A1* | 7/2011 | Ueda | G01C 21/3438 455/67.11 |
| 2012/0016945 A1* | 1/2012 | Yu | G06Q 10/107 709/206 |
| 2012/0158728 A1* | 6/2012 | Kumar | G06F 16/954 707/737 |
| 2013/0166666 A1* | 6/2013 | Emura | G06Q 30/00 709/206 |

* cited by examiner

| NO. | RECIPIENT | SENDER | EMAIL SUBSTANCE INFORMATION | DESIRED SEND CONDITION | SCHEDULED SENT TIME | ITEM INFORMATION OF SEND CANDIDATE INFORMATION |
|---|---|---|---|---|---|---|
| 0001 | abc@··· | 12345 | ···· | 2013/9/1 18:00:00 | 2013/9/1 18:00:00 | ···· |
| 0002 | abc@··· | 54321 | ···· | 2013/9/1 18:00:00 | 2013/9/1 21:00:00 | ···· |
| 0003 | cba@··· | 12345 | ···· | 2013/9/1 18:00:00 | 2013/9/1 21:00:00 | ···· |
| ··· | ··· | ··· | ··· | ··· | ··· | ··· |

ITEM INFORMATION OF SEND CANDIDATE INFORMATION

| ITEM ID | CATEGORY 1 | CATEGORY 2 | ... | PRICE | POINT | SHIPPING FEE | WEIGHT | PIXELS | ZOOM | MEMORY CAPACITY | HDD CAPACITY | SCREEN SIZE | ... |
|---|---|---|---|---|---|---|---|---|---|---|---|---|---|
| c-123 | HOME APPLIANCES & PC | CAMERAS | ... | 15,000 | 2 | FREE | 250 | 500 | 10 | — | — | — | |
| ... | | | | | | ... | | | | ... | | | |

| USER ID | ITEM ID | PRICE | POINT | SHIPPING FEE | WEIGHT | PIXELS | ZOOM | MEMORY CAPACITY | HDD CAPACITY | SCREEN SIZE |
|---|---|---|---|---|---|---|---|---|---|---|
| 11111 | c-123 | 0.3 | 0.2 | 0.3 | 0.05 | 0.05 | 0.1 | — | — | — |
| 22222 | p-500 | 0.1 | 0.02 | 0.01 | — | — | — | 0.17 | 0.2 | 0.5 |
| 32222 | p-500 | 0.4 | 0.3 | 0.2 | — | — | — | 0.1 | 0 | 0 |
| ... | ... | ... | ... | ... | ... | ... | ... | ... | ... | ... |

FIG.5

| USER ID | PURCHASED ITEM ID | PURCHASE TIME | OPERATION INFORMATION | EMAIL SENT TIME |
|---|---|---|---|---|
| 11111 | c-123 | 2013/8/7 21:00:00 | ... | 2013/8/7 18:00:00 |
| 22222 | p-500 | 2013/8/9 22:00:00 | ... | 2013/8/8 18:00:00 |
| ... | | | | |

FIG.6

| USER ID | RECIPIENT | EMAIL SUBSTANCE INFORMATION | ... |
|---|---|---|---|
| 11111 | abc@... | ... | |
| 22222 | cbb@... | ... | |
| ... | ... | ... | |

FIG.9

ITEM INFORMATION OF SEND CANDIDATE INFORMATION

| ITEM ID | CATEGORY 1 | CATEGORY 2 | ... | PRICE | POINT | SHIPPING FEE | WEIGHT | PIXELS | ZOOM | MEMORY CAPACITY | HDD CAPACITY | SCREEN SIZE |
|---|---|---|---|---|---|---|---|---|---|---|---|---|
| c-123 | HOME APPLIANCES & PC | CAMERAS | | 15,000 | 2 | FREE | 250 | 500 | 10 | — | — | — |
| c-123 | HOME APPLIANCES & PC | CAMERAS | | 14,980 | 1 | FREE | 250 | 500 | 10 | — | — | — |
| ... | | | | | | | | | | | | |
| p-500 | HOME APPLIANCES & PC | PC | | 70,000 | 1 | FREE | 2400 | — | — | 4 | 500 | 13 |
| p-500 | HOME APPLIANCES & PC | PC | | 70,000 | 1 | FREE | 2400 | — | — | 4 | 500 | 13 |
| ... | | | | | | | | | | | | |

FIG.14

EMAIL-TRANSMISSION SETTING DEVICE, EMAIL-TRANSMISSION SETTING METHOD, PROGRAM FOR EMAIL-TRANSMISSION SETTING DEVICE, AND STORAGE MEDIUM

CROSS REFERENCE TO RELATED APPLICATIONS

This application is a National Stage of International Application No. PCT/JP2013/076612 filed Sep. 30, 2013, the contents of which are incorporated herein by reference in their entirety.

TECHNICAL FIELD

The present invention relates to techniques for an email-transmission setting device, an email-transmission setting method, a program for the email-transmission setting device, and a storage medium.

BACKGROUND ART

There are services that send users emails, such as magazines by email. Various email devices that automatically send emails have been developed. For example, Patent Literature 1 discloses an email device that automatically sends an unsent mail waiting to be sent when receiving opening notification information for a sent mail, which was already sent, from the address that is the same as an address of the unsent mail.

CITATION LIST

Patent Literature

Patent Literature 1: JP H11-177613 A

SUMMARY OF INVENTION

Technical Problem

However, the number of mails sent by email and the data amount, such as the size, of emails has increased. For this reason, the technique in Patent Literature 1 may coincidentally send a plurality of emails to the same recipient and then cause concentration of the sent times of the plurality of emails, thus increasing the load on an email delivery system.

In view of such a problem, it is an object of the present invention to provide, for example, an email-transmission setting device that is capable of reducing the load on an email delivery system by dispersing emails.

Solution to Problem

To solve the above problem, the invention according to claim 1 includes send candidate information storage means, extracting means, and send timing setting means. The send candidate information storage means stores a plurality of pieces of send candidate information. Each piece of send candidate information has sender identification information identifying a sender of an email, recipient identification information identifying a recipient of the email, item identification information, item information that are associated with each other. The item information includes element values of one or more elements. From among the stored pieces of send candidate information, the extracting means extracts two or more pieces of send candidate information that have different pieces of the sender identification information, the same recipient identification information, and related pieces of the item identification information. The send timing setting means compares element values included in the pieces of item information of the two or more extracted pieces of send candidate information. Based on a result of the comparison, the send timing setting means sets timings for sending emails corresponding to the two or more extracted pieces of send candidate information to at least two different timings.

Thus, the load on an email delivery system can be reduced by dispersing emails at least two different timings, based on the emails' values determined by comparing element values included in item information. In addition, based on the load on the system, an email relatively more valuable to a user can be preferentially sent.

The invention according to claim 2 the email-transmission setting device according to claim 1 in which the extracting means further extracts two or more pieces of send candidate information that have the same category to which items corresponding to pieces of item identification information thereof belong. The send timing setting means compares element values of an element corresponding to a category to which the items corresponding to the pieces of item identification information of the two or more extracted pieces of send candidate information belong.

In this case, comparing only the element values of the element corresponding to the category to which the items belong can reduce the processing load, of the system more than comparing the element values of all element.

The invention according to claim 3 is the email-transmission setting device according to claim 1 or 2 in which the send candidate information storage means further stores a sent time at which an email including the send candidate information was sent to the recipient identification information. The email-transmission setting device further includes priority setting means. The priority setting means extracts two or more emails that have both the same recipient identification information and the same category to which an item corresponding to the item identification information belongs and whose difference between the sent time and the current time is less than or equal to a threshold value. The priority setting means sets a priority on an element to be compared based on element values included in the item information in an email that was handled by a user corresponding to the recipient identification information and on element values included in the item information in an email that was not handled by the user, among the extracted emails. The send timing setting means compares values of an element based on the set priority, among elements included in each of the pieces of item information of the two or more extracted pieces of send candidate information.

In this case, the comparison range is extended by simultaneous or previous emails and is based on a user history of operations performed by the receiver of the emails. Thus, the values of emails are more appropriately evaluated. Accordingly, emails are dispersed based on more appropriate values of the emails.

The invention according to claim 4 is the email-transmission setting device according to any one of claims 1 to 3 further including element value changing means. The element value changing means changes an element value of at least one or more element included in the item information in some of the two or more extracted pieces of send candidate information, based on a result of comparison by the send timing setting means.

In this case, changing the element value(s) of the element(s) inferior to those in another piece of send candidate information to be compared can improve the relative value of an email.

The invention according to claim 5 is the email setting device according to claim 4 further including second priority setting means. The second priority setting means extracts two or more emails that have both the same recipient identification information and the same category to which an item corresponding to the item identification information belongs and whose difference between the current time and a sent time at which an email including the send candidate information was sent to the recipient identification information is less than or equal to a threshold value. The second priority setting means sets a second priority over each element on an element value to be changed by the element value changing means, based on element values included in the item information in an email that was handled by a user corresponding to the recipient identification information and on element values included in the item information in an email that was not handled by the user, among the extracted emails. The element value changing means changes an element value based on the set second priority, among elements included in each of the pieces of item information of the two or more extracted pieces of send candidate information.

In this case, changing the element value of an element inferior to that in another piece of send candidate information to be compared using priorities based on the user's operation history can further improve the values of emails.

The invention according to claim 6 is the email setting device according to claim 4 in which the element value changing means preferentially changes an element value that has a smaller difference from a corresponding element value, among a plurality of element values that are included in each of the pieces of item information and that are to be compared by the send timing setting means.

In this case, among the element value(s) of the element(s) inferior to those in another piece of send candidate information to be compared, preferentially changing an element value that has a smaller difference from the corresponding element value in the other piece of send candidate information to be compared can reduce the amount of the change and further improve the values of emails.

The invention according to claim 7 is the email setting device according to claim 4 in which the element value changing means changes an element value of an element of high third priority. The third priority is set based on at least one piece of user information of a user corresponding to the recipient identification information and history information of the user.

In this case, changing the element value of a high-priority element, among the element(s) inferior to those in another piece of send candidate information to be compared, based on at least one piece of the user information and the history information of the user can effectively change the element value of an element to which the user attaches importance and further improve the values of emails.

The invention according to claim 8 includes the following steps. Send candidate information storage means stores a plurality of pieces of send candidate information. Each piece of send candidate information has sender identification information identifying a sender of an email, recipient identification information identifying a recipient of the email, item identification information, item information that are associated with each other. The item information includes element values of one or more elements. From among the stored pieces of send candidate information, extracting means extracts two or more pieces of send candidate information that have different pieces of the sender identification information, the same recipient identification information, and related pieces of the item identification information. Send timing setting means compares element values included in the pieces of item information of the two or more extracted pieces of send candidate information. Based on a result of the comparison, the send timing setting means sets timings for sending emails corresponding to the two or more extracted pieces of send candidate information to at least two different timings.

The invention according to claim 9 causes a computer to function as send candidate information storage means, extracting means, and send timing setting means. The send candidate information storage means stores a plurality of pieces of send candidate information. Each piece of send candidate information has sender identification information identifying a sender of an email, recipient identification information identifying a recipient of the email, item identification information, item information that are associated with each other. The item information includes element values of one or more elements. From among the stored pieces of send candidate information, the extracting means extracts two or more pieces of send candidate information that have different pieces of the sender identification information, the same recipient identification information, and related pieces of the item identification information. The send timing setting means compares element values included in the pieces of item information of the two or more extracted pieces of send candidate information. Based on a result of the comparison, the send timing setting means sets timings for sending emails corresponding to the two or more extracted pieces of send candidate information, to at least two different timings.

In the invention according to claim 10, a program for a mail-transmission setting device is stored in a computer-readable format. The program causes a computer to function as send candidate information storage means, extracting means, and send timing setting means. The send candidate information storage means stores a plurality of pieces of send candidate information. Each piece of send candidate information has sender identification information identifying a sender of an email, recipient identification information identifying a recipient of the email, item identification information, item information that are associated with each other, The item information includes element values of one or more elements. From among the stored pieces of send candidate information, the extracting means extracts two or more pieces of send candidate information that have different pieces of the sender identification information, the same recipient identification information, and related pieces of the item identification information. The send timing setting means compares element values included in the pieces of item information of the two or more extracted pieces of send candidate information. Based on a result of the comparison, the send timing setting means sets timings for sending emails corresponding to the two or more extracted pieces of send candidate information to at least two different timings.

Advantageous Effects of Invention

According to the present invention, the load on an email delivery system can be reduced by dispersing emails. Also according to the present invention, when, for example, many emails that apply a large load on the system are sent (many communication resources are used), an email relatively more valuable to a user (appealing to the user) can be preferentially sent.

BRIEF DESCRIPTION OF DRAWINGS

FIG. 3 is a schematic diagram showing an example of data stored in an email information database in FIG. 2.

FIG. 4 is a schematic diagram showing an example of item information in FIG. 3.

FIG. 5 is a schematic diagram showing an example of weight information for each element of the item information.

FIG. 6 is a schematic diagram showing an example of history information.

FIG. 9 is a schematic diagram showing an example of a send list that a store makes to register emails.

FIG. 14 is a schematic diagram showing an example of email substance analysis information.

DESCRIPTION OF EMBODIMENTS

The following describes an embodiment of the present invention with reference to the drawings. In the embodiment described below, the present invention is applied to an email delivery system.

1. Configuration and Functional Overview of Email Delivery System

First, a configuration and a functional overview of an email delivery system according to an embodiment of the present invention is described with reference to FIG. 1.

Figure 1:
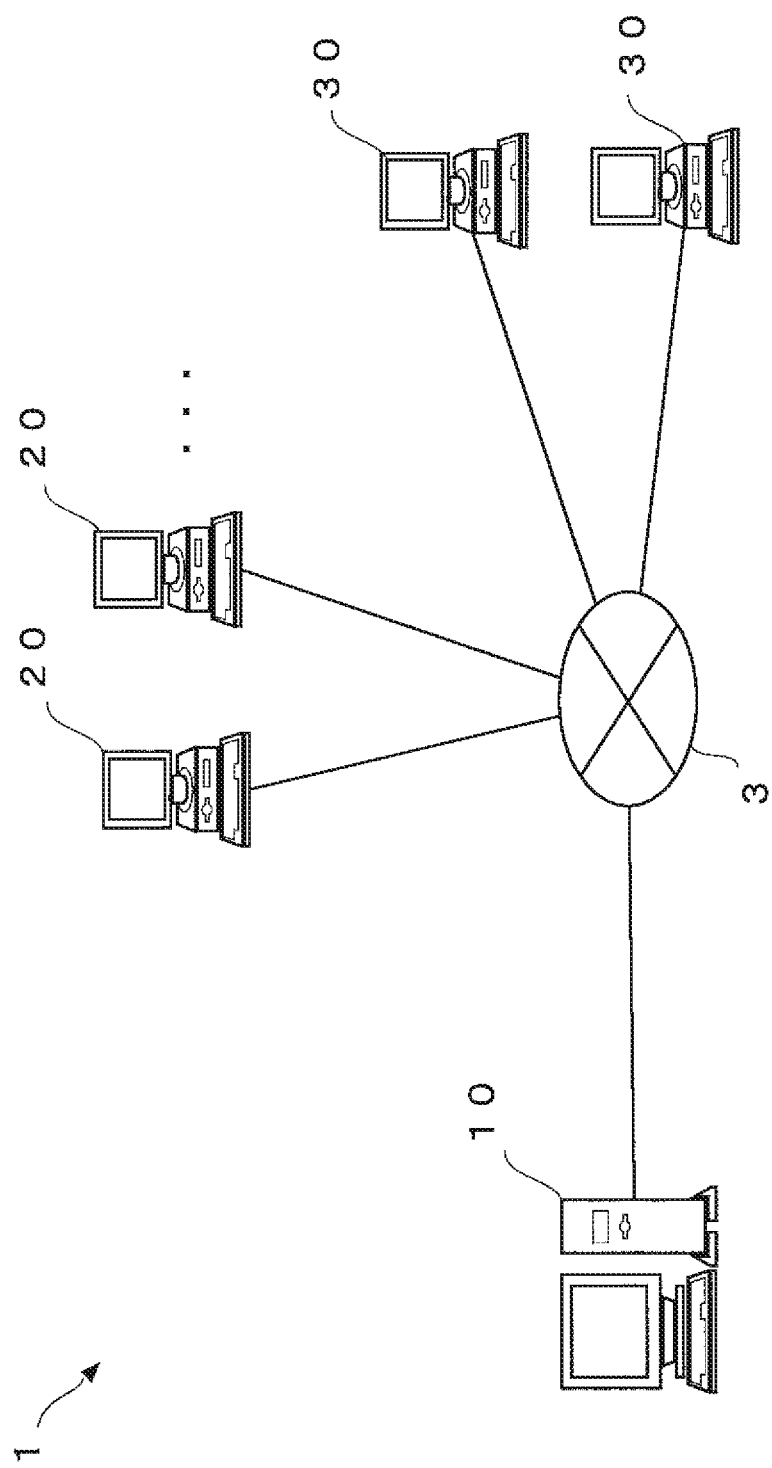
FIG. 1 is a schematic diagram schematically showing an example configuration of an email delivery system according to an embodiment of the present invention.

FIG. 1 is a schematic diagram schematically showing an example configuration of an email delivery system 1 according to this embodiment.

As shown in FIG. 1, the email delivery system 1 includes an information processing server 10 (an example of an email setting device), store terminal devices 20, and user terminal devices 30. The information processing server 10 is installed to operate a shopping site. Each of the store terminal devices 20 belongs to a store that provides the shopping site with items. Each of the user terminal devices 30 belongs to a user who shops on the shopping site.

The information processing server 10 is capable of exchanging data with each store terminal device 20 and each user terminal device 30 over a network 3 using communication protocols, such as TCP/IP. The network 3 includes, for example, the Internet, a dedicated communication line (e.g., community antenna television (CATV) line), a mobile communication network (including base stations), and a gateway.

The information processing server 10 is a computer of the shopping site that is an electronic mall.

Each store terminal device 20 is a computer of a tenant who provides the shopping site with items. The store terminal device 20 has a web browser function and displays, for example, a screen for receiving item information of merchandise items. The tenant registers merchandise items and writes an email to be sent to an email address (an example of email recipient identification information) of a user of a user terminal device 30, using the store terminal device 20

Each user terminal device 30 is a computer of a user who purchases items on the shopping site. The user terminal device 30 has a web browser function and displays an item search on its screen. The user terminal device 30 receives emails from the information processing server 10.

The email server (not shown) corresponding to each recipient is connected to the information processing server 10 and each user terminal device 30 via the network 3. The email server corresponding to each sender is the information processing server 10. Alternatively, it may be another email server for delivery.

2. Configuration and Functions of Information Processing Server and Each Terminal Device 2.1 Configuration and Functions of Information Processing Server 10

The following describes a configuration and functions of the information processing server 10 with reference to FIGS. 2 to 6.

Figure 2:
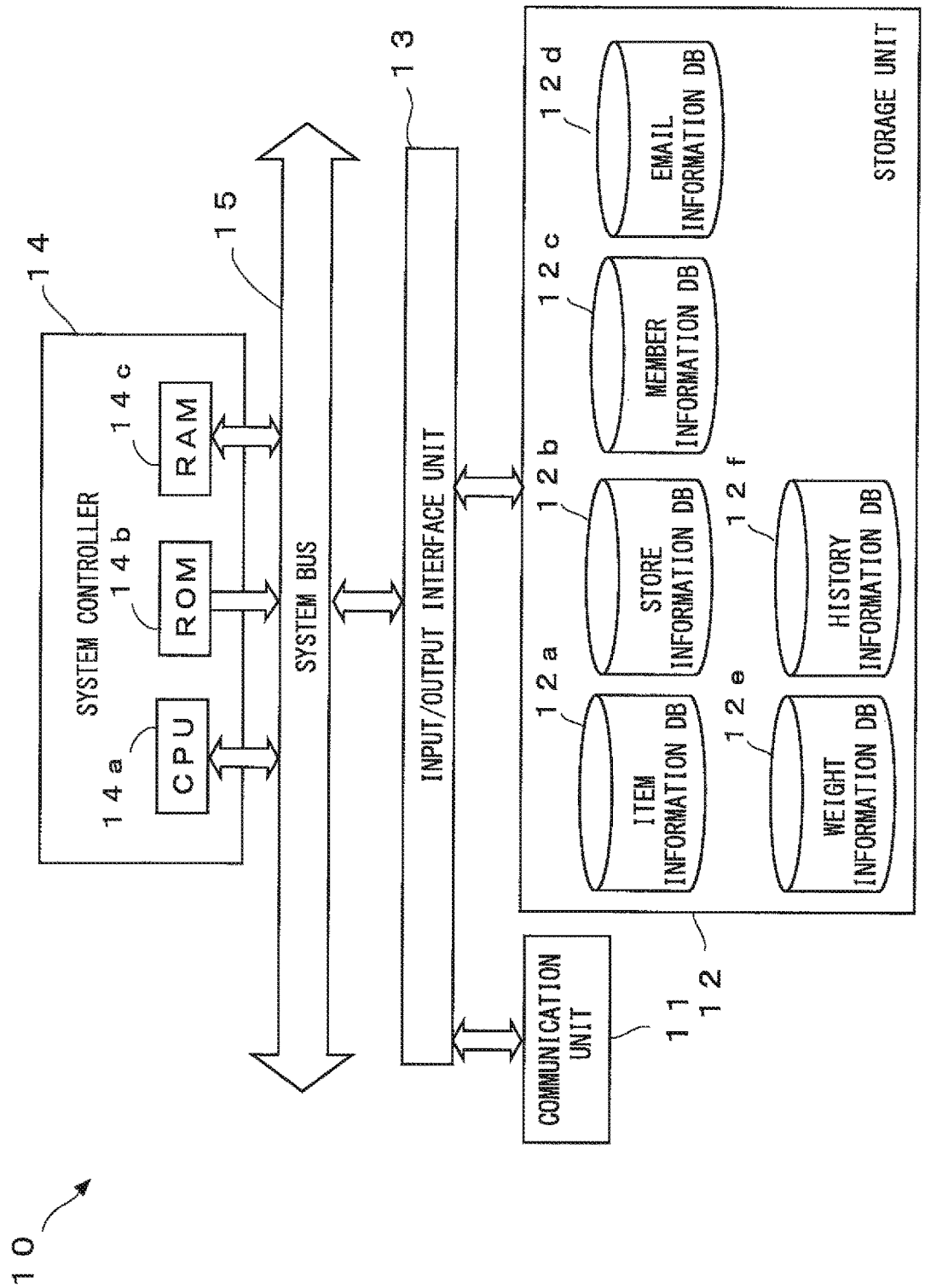
FIG. 2 is a block diagram schematically showing an example configuration of an information processing server in FIG. 1.

FIG. 2 is a block diagram schematically showing an example configuration of the information processing server 10. FIG. 3 is a schematic diagram showing an example of data stored in an email information database. FIG. 4 is a schematic diagram showing an example of item information. FIG. 5 is a schematic diagram showing an example of weight information for each element of the item information. FIG. 6 is a schematic diagram showing an example of history information.

As shown in FIG. 2, the information processing server 10 includes a communication unit 11, a storage unit 12, an input/output interface unit 13, and a system controller 14. The system controller 14 and the input/output interface unit 13 are connected via a system bus 15.

The communication unit 11 connects to the network 3 and controls the state of communications with, for example, the store terminal devices 20 and the user terminal devices 30.

The storage unit 12 (an example of send candidate information storage means) includes, for example, hard disk drives. The storage unit 12 stores various programs, such as an operating system and server programs, and files including web pages written in a markup language, such as HTML. The various programs may be available from, for example, another server device over the network 3, or may be recorded in a recording medium and read via a drive device.

In the storage unit 12, an item information database 12a (hereinafter, simply an "item information DB 12a"), a store information database 12b (hereinafter, simply a "store information DB 12b"), a member information database 12c (hereinafter, simply a "member information DB 12c"), an email information database 12d (hereinafter, simply an "email information DB 12d"), a weight information database 12e (hereinafter, simply a "weight information DB 12e"), a history information database 12f (hereinafter, simply a "history information DB 12f"), and other databases are created.

The item information DB 12a stores information about items, such as item names, types, item images, specifications, and item introduction summaries, advertisement information, and other information.

The store information DB 12b stores store information, such as store IDs of stores, store descriptions, store names, addresses, telephone numbers, email addresses for the stores, and information about merchandise items. Each of the store IDs is an example of email sender identification information. Each of the email addresses is an example of the email sender identification information. The store information DB 12b also stores, for each store, an acceptable range of fluctuation (e.g., the minimum price and the maximum number of points given at a rebate rate in points) that means how much fluctuation in, for example, price is acceptable.

The member information DB 12c stores user information, such as user IDs of users who have signed up the shopping site (users of the shopping site), names, addresses, telephone numbers, email addresses, professions, hobbies, purchase histories, themes or genres that interest the users. The member information DB 12c also stores user IDs, login IDs, and passwords that are required to log in to the shopping site from the user terminal devices 30. Each login ID and the corresponding password are authentication information used in a login process (process for authenticating a user).

As shown in FIG. 3, the email information DB 12d (an example of the send candidate information storage means) stores pieces of recipient identification information such as email addresses, pieces of sender identification information such as store IDs, pieces of email substance information such as email messages, desired send conditions such as desired sent times at which the corresponding emails are to be sent, scheduled sent times, and pieces of item information that are analysis results of email substance information in association with each other as pieces of send candidate information. Each piece of recipient identification information is an example of the email recipient identification information. Each piece of sender identification information is an example of the email sender identification information. Each piece of email substance information is an example of an email substance including a plurality of components. Each piece of send candidate information is assigned a number. Each sender may be an email address for a store. Each scheduled sent time is set by default to, for example, a desired sent time included in the corresponding desired send condition.

The email information DB 12d may further store, for example, sent times at which emails, such as emails previously sent, were sent when their scheduled sent time had come. That is, the email information DB 12d may store the sent time at which an email including send candidate information was sent to each piece of recipient identification information.

As shown in FIG. 4, the item information in the email information DB 12d stores, in association with each item ID (an example of item identification information), categories arranged in the order from the top category "category 1" to sub-categories for items, an item price, points on an item purchase, a shipping fee, weight, the number of pixels, and other elements. Examples of the points include the number of points actually given at the time of item purchase and a rebate rate in points given at the time of item purchase.

The price, the points, and the shipping fee are elements related to price. The weight, the number of pixels, and other elements are related to item specifications.

As shown in FIG. 5, in the weight information DE 12e, each of the elements related to price and the elements related to item specifications is assigned a weight indicating its priority (including a second priority and a third priority), in association with, for example, an item category (e.g., an item ID) and user information (e.g., a user ID). For example, a high-priority element is assigned a high weight and a low-priority element is assigned a low weight. The weights may be set so that their sum is equal to 1.

As shown in FIG. 5, the weights for the elements may be set for each piece of information identifying a recipient user (email recipient identification information) (e.g., each user ID). For example, the weight for each of the elements related to price and the elements related to item specifications may be set for each user. The weight for each element may be set according to user gender, user age, and the like. Priorities may be set instead of the weights. For example, the priority for the price may be set to "1", the priority for the points may be set to "0.9", the priority for the shipping fee may be set to "0.8" and the priority for the weight may be set to "0.7".

These weights are set by referring to the history information DB 12f, based on history information, such as a history of sent emails, a history of user operations on the sent emails, and a history of user operations that led to purchase of the items corresponding to item identification information included in the sent emails. For example, the information processing server 10 compares each element value of the item corresponding to item identification information included in an email, among a plurality of emails sent to a user A, that was handled by the user with each element value of the item corresponding to item identification information included in another email that was not handled by the user. The information processing server 10 then assigns a higher priority to the weight(s) for the element(s) corresponding to element value(s), in which the item corresponding to the item identification information included in the email that was handled by the user is superior, than to the weights for the other elements, and associates the weight(s) for the element(s) with information identifying the user A (e.g., the user ID).

Examples of the email that was handled include an email whose email substance was read, an email whose email substance includes a link that was clicked, an email whose email substance includes a link that was clicked and then caused the corresponding item to be purchased.

The comparison may be made between emails corresponding to items that belong to at least one same category or emails that were sent to the user A within a predetermined period of time (e.g., two hours or twenty four hours). If there is no email to be compared, the information processing server 10 may compare each element value with a corresponding reference element value, and assign a higher priority to the weight(s) for the element(s) corresponding to element value(s), in which the item corresponding to the item identification information included in the email that was handled by the user is superior, than to the weights for the other elements, and associate the weight(s) for the element(s) with information identifying the user A. That is, each element with an element value superior to the corresponding element's element value to be compared is assigned a high weight because the user A attaches importance to the element.

Examples of the reference element value include a freely preset element value, the average value of the corresponding element values of all items that belong to at least one of the categories of the item corresponding to the item identification information included in the email to be compared, among the pieces of item information stored in the item information DB 12a, and the average value of the corresponding element values of items that belong to at least one of the categories of the item corresponding to item identification information included in the email to be compared and that were purchased by users within a predetermined period of time (e.g., seven days, thirty days, or ninety days).

As shown in FIG. 6, the history information DB 12f stores history information, such as the item ID of a purchased item, a purchase time, operation information, and an email sent time, in association with each user ID. Examples of the operation information include which portion in an email was clicked, for example, user operation history information, such as a pointer trajectory or how much scrolling was performed, and the display position of clicked link information included in mail substance information.

Alternatively, the weight for each element may be set based on user information, such as user gender and age. For example, the information processing server 10 compares each element value of the item corresponding to item identification information included in an email, among a plurality of emails sent to the user A, that was handled by the user with each element value of the item corresponding to item identification information included in another email that was not handled by the user. The information processing server 10 then sets, for each user, the weights so that the weight(s) for the element(s) corresponding to element value(s), in which the item corresponding to the item identification information included in the email that was handled by the user is superior, is assigned a higher priority than the weights for the other elements. Then, the information processing server 10 sums up the set weights according to user gender, age groups, and the like, by referring to the member information DB 12c using user IDs, and then sets the weight for each element based on user gender, age, and the like.

Alternatively, these pieces of weight information may be stored in the item information DB 12a or the email information DB 12d. When the weights for the elements are set for each user, the weights may be stored in the member information DB 12c.

The email information DB 12d also stores, for each element, a threshold value for determining whether to change the corresponding element value. For example, a threshold value for the price and a threshold value for the points are set.

These threshold values may be set for each user. For example, the threshold value for the price is set lower than the other elements for a user who is sensitive to price (a user who attaches importance to price), and the threshold value for the item specifications is set lower than the other elements for a user who attaches importance to specifications.

To set a threshold value for determining whether to change the corresponding element value, for example, the information processing server 10 compares each element value of the item corresponding to item identification information included in an email, among a plurality of emails sent to the user A, that was handled by the user with each element value of the item corresponding to item identification information included in another email that was not handled by the user. The information processing server 10 then sets the threshold value(s) for the element(s) corresponding to element value(s), in which the item corresponding to the item identification information included in the email that was handled by the user is superior (of which second or third priority is higher), lower than the threshold values for the other elements. Setting the threshold value for a superior element lower makes the element to be changed more likely to be changed as an element to which the user attaches importance The threshold values for the elements of users may be summed up according to user gender, age groups, and the like, by referring to the member information DB 12c using user IDs, and then the threshold value for each element may be set.

This email is two or more emails that have both the same recipient identification information and the same category to which the item corresponding to item identification information belongs and whose difference between the current time and the sent time at which the email including the send candidate information was sent to the recipient identification information is less than or equal to a threshold value.

In this manner, the information processing server 10 functions as an example of second priority setting means. The second priority setting means extracts two or more emails that have both the same recipient identification information and the same category to which the item corresponding to the item identification information belongs and whose difference between the current time and the sent time at which the email including the send candidate information was sent to the recipient identification information is less than or equal to the threshold value, and sets second priorities over each element on element value(s) to be changed by the element value changing means, based on the element values included in the item information in an email that was handled by the user corresponding to the recipient identification information and on the element values included in the item information in an email that was not handled by the user, among the extracted emails.

The email information DB 12d or the item information DB 12a stores information indicating a hierarchy of categories and the relationship among the categories. The email information DB 12d or the item information DB 12a stores item IDs in association with each other, as information indicating the relationship among items. The information indicating the hierarchy of the categories and the relationship among the categories may be used as the relationship among items.

The email substance may be the email body portion of an email to be sent, the portion excluding the email header from the email to be sent, or the entire email to be sent including the email header. The email information (the email header and the email body portion) of an email to be sent as a packet-based communication and recipient identification information may be stored in association with each other. The email information is an example of the email substance.

2.2 Configuration and Functions of Store Terminal. Device 20

Figure 7:
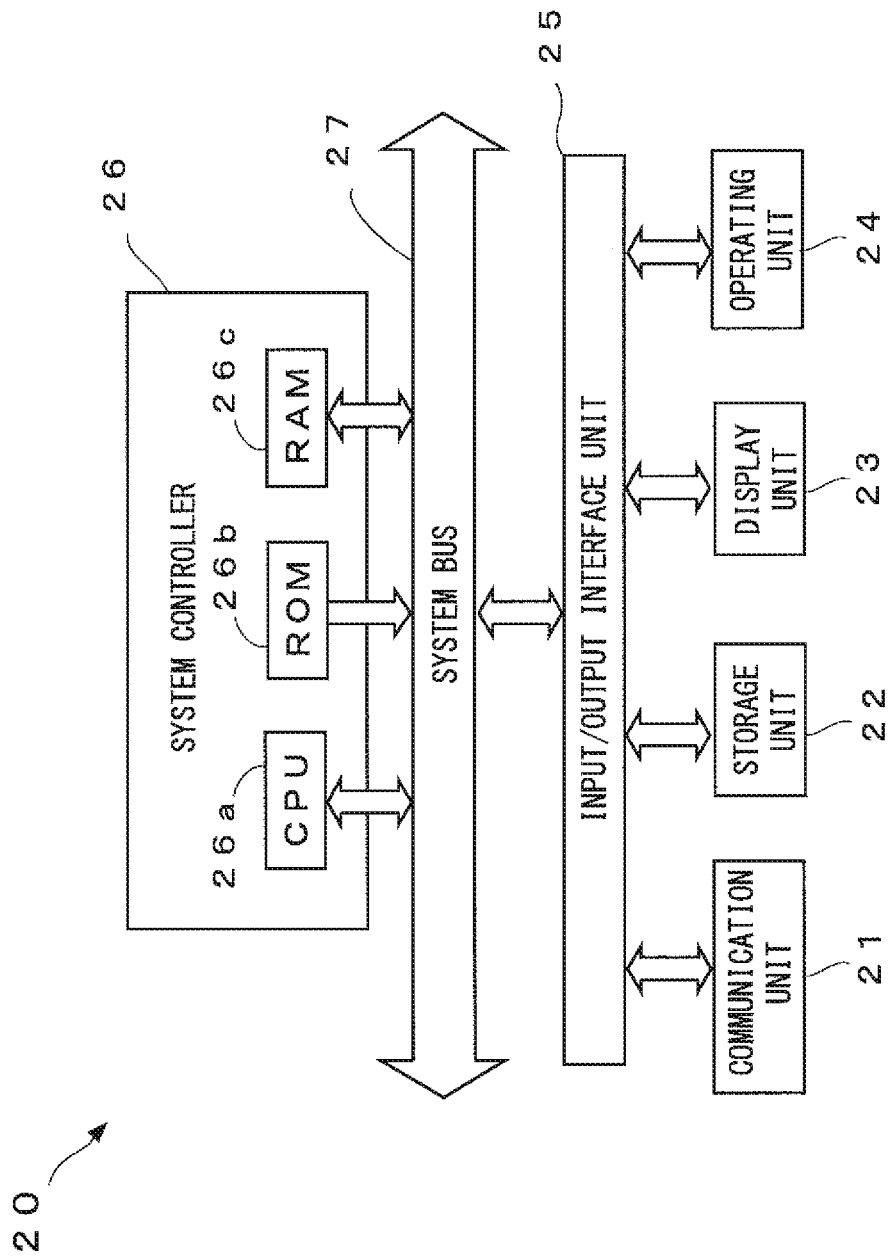
FIG. 7 is a block diagram schematically showing an example configuration of a store terminal device in FIG. 1.

The following describes a configuration and functions of the store terminal device 20 with reference to FIG. 7.

FIG. 7 is a block diagram schematically showing an example configuration of the store terminal device 20.

As shown in FIG. 7, the store terminal device 20 operates as a computer and is, for example, a personal computer, a wireless mobile phone including a smartphone, or a mobile terminal such as a FDA. The store terminal device 20 includes a communication unit 21, a storage unit 22, a display unit 23, an input unit 24, an input/output interface unit 25, and a system controller 26. The system controller 26 and the input/output interface unit 25 are connected via a system bus 27.

The communication unit 21 controls the state of communications with, for example, the information processing server 10 over the network 3. When the store terminal device 20 is a mobile terminal device, the communication unit 21 has a wireless communication function to connect to a mobile communication network of the network 3.

The storage unit 22 includes, for example, hard disk drives. The storage unit 22 stores an operating system, a web browser program, a toolbar program for the web browser, and other programs.

The display unit 23 (an example of display means) includes, for example, liquid crystal display elements or electroluminescence (EL) devices. The web browser displays a web page for receiving information about an item on the display unit 23.

The input unit 24 includes, for example, a keyboard and a mouse. A user enters a response via the input unit 24. When the display unit 23 is touch switch type of display panel such as a touch screen, the input unit 24 obtains information about which position in the display unit 23 the user touches or closely approaches.

The input/output interface unit 25 is an interface between the communication unit 21 and the storage unit 22, and the system controller 26.

The system controller 26 has, for example, a CPU 26a, a ROM 26b, and a RAM 26c. In the system controller 26, the CPU 26a reads and executes various programs stored in the ROM 26b, the RAM 26c, and the storage unit 22. For example, the system controller 26 executes the web browser program to function as the web browser.

2.3 Configuration and Functions of User Terminal Device 30

Figure 8:
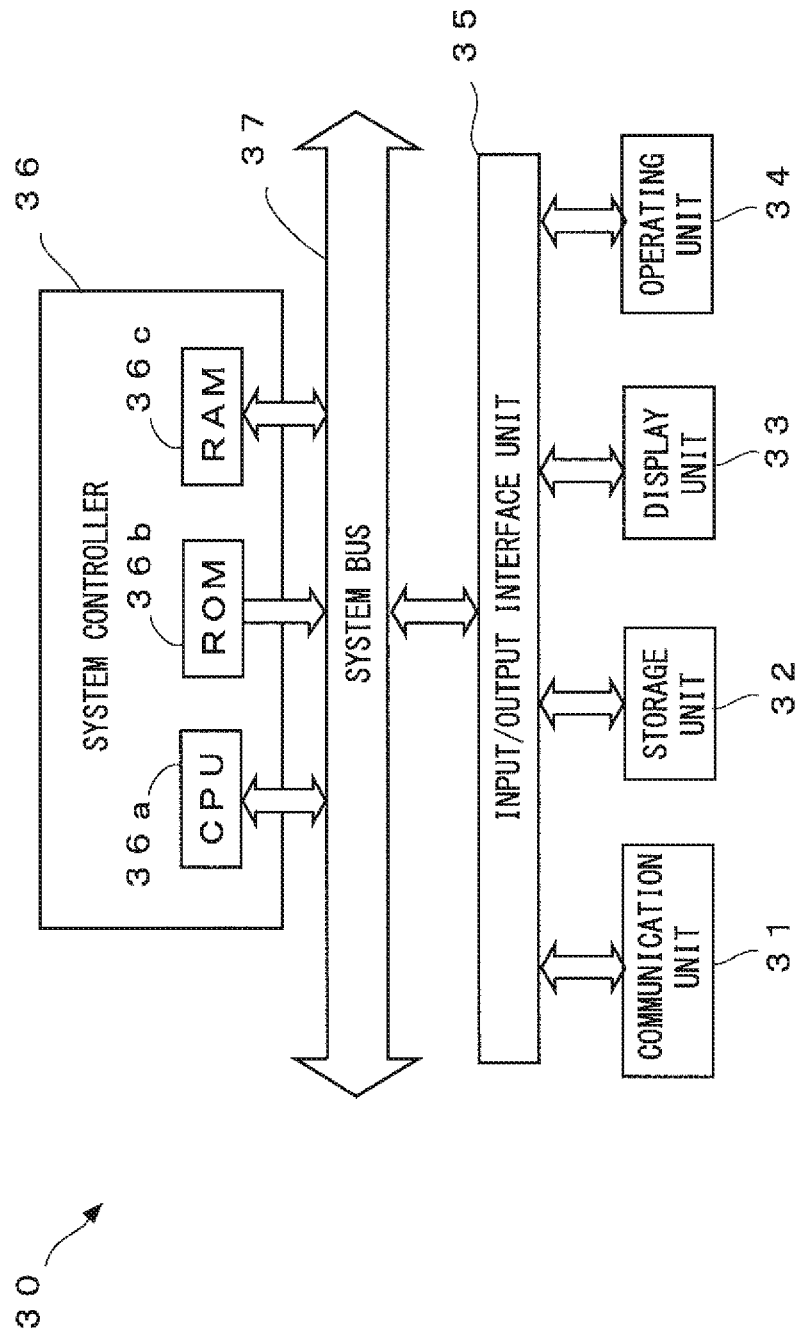
FIG. 8 is a block diagram schematically showing an example configuration of a user terminal device in FIG. 1.

The following describes a configuration and functions of the user terminal device 30 with reference to FIG. 8.

FIG. 8 is a block diagram schematically showing an example configuration of the user terminal device 30.

As shown in FIG. 8, as with store terminal device 20, the user terminal device 30 operates as a computer and is, for example, a personal computer, a wireless mobile phone including a smartphone, or a mobile terminal such as a PDA, The user terminal device 30 includes a communication unit 31, a storage unit 32, a display unit 33, an input unit 34, an input/output interface unit 35, and a system controller 36. The system controller 36 and the input/output interface unit 35 are connected via a system bus 37. The configuration and the functions of the user terminal device 30 are approximately the same as the configuration and the functions of the store terminal device 20, and thus are not described in detail herein.

On the display unit 33, the email message of an email generated by an information processing device 10 is displayed based on information from the store terminal device 20.

3. How Email Delivery System Works

The following describes how the email delivery system 1 according to an embodiment of the present invention works with reference to the drawings.

3.1 Example of How Information Processing Server Receives Send List Information

First, an example of how the information processing server receives send list information is described with reference to FIGS. 9 to 11.

FIG. 9 is a schematic diagram showing an example of a send list that a store makes to register emails. FIG. 10 is a flowchart showing an example of how the information processing server 10 receives send list information. FIG. 11 is a schematic diagram showing an example of a send list reception screen displayed on the store terminal device 20.

First, when a send list is registered, as shown in FIG. 9, email addresses of users (customers) of user terminal devices 30 and pieces of email substance information written in HTML or the like, and other information are entered using spreadsheet software on the store terminal device 20 and then stored in a send list file, for example, in a comma-separated values (CSV) form.

Instead of using the CSV file, the send list may be directly registered using, for example, a program or a tool on the Web. In each email substance information field in FIG. 9, information indicating a storage location where an HTML file as email substance information is stored may be entered. Based on this storage location, the corresponding email substance information may be uploaded to the information processing server 10 at the time of receipt of the send list file.

Subsequently, the store terminal device 20 requests a send list reception page to register send list information in the information processing server 10.

Figure 10:
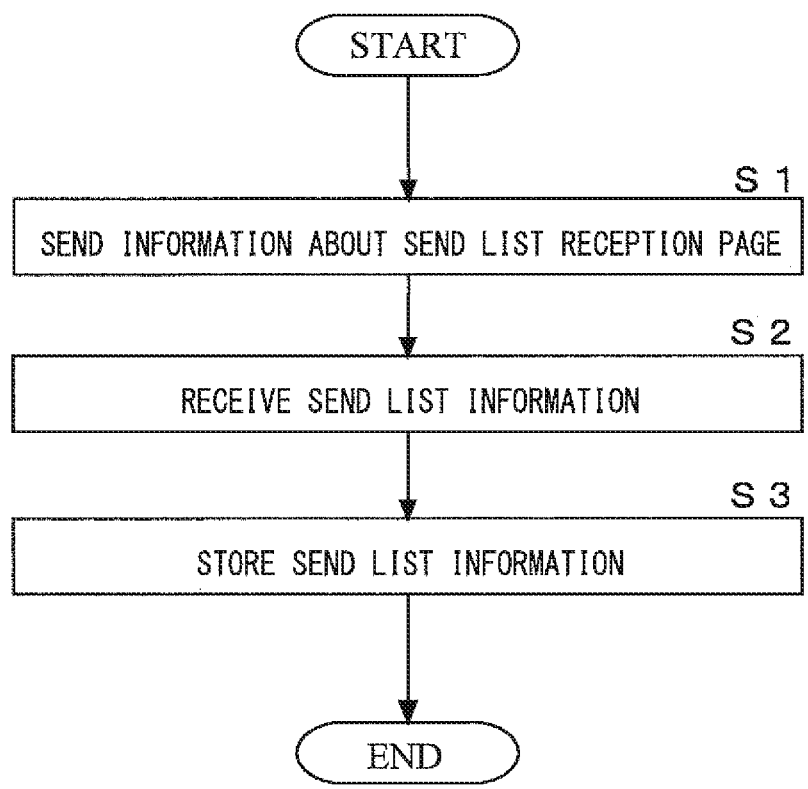
FIG. 10 is a flowchart showing an example of how the information processing server in FIG. 1 receives send list information.

Next, as shown in FIG. 10, the information processing server 10 sends information about the send list reception page (Step S1). Specifically, when a send list reception page request is received, the system controller 14 of the information processing server 10 sends the information about the send list reception page to the store terminal device 20 that has made the request.

Figure 11:
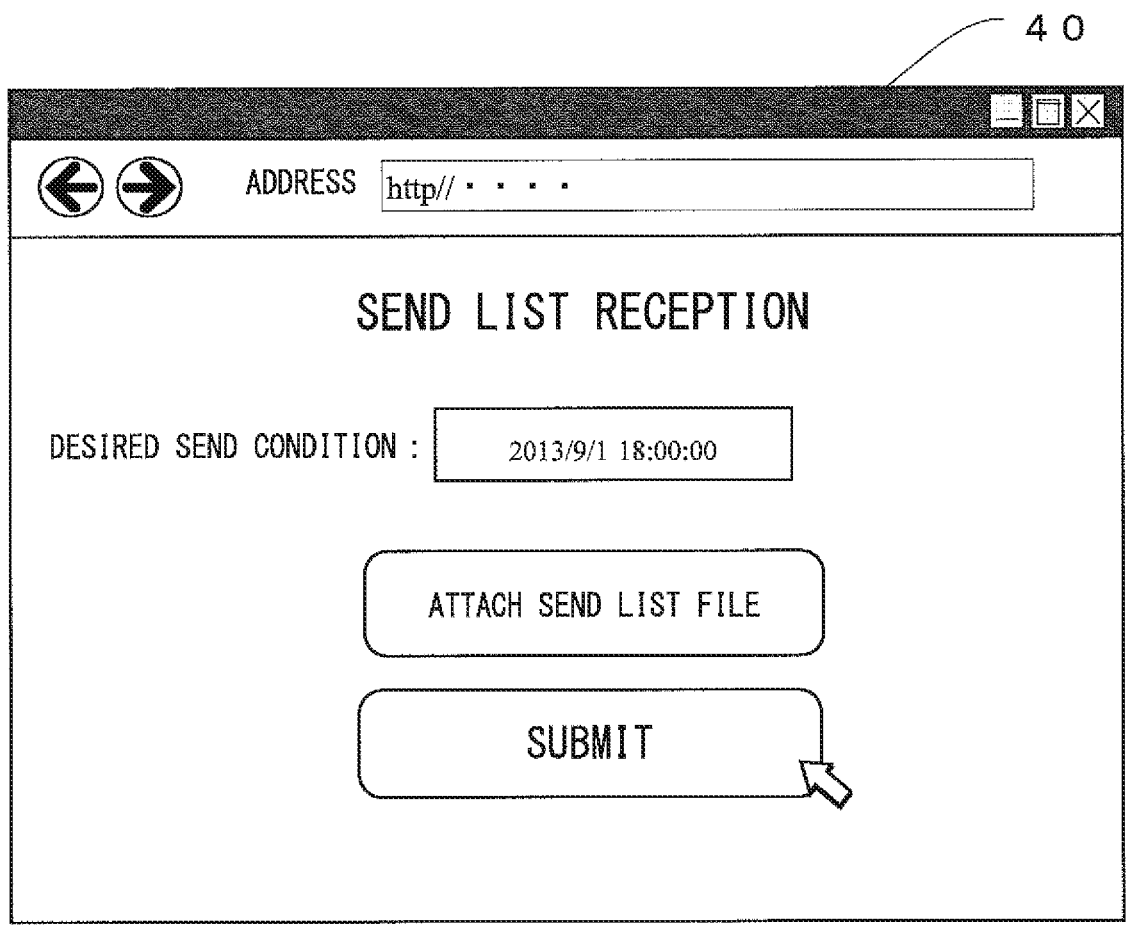
FIG. 11 is a schematic diagram showing an example of a send list reception screen displayed on the store terminal device in FIG. 1.

As shown in FIG. 11, the store terminal device 20 displays a send list reception page 40 on the display unit 23. Then, a store enters a desired send condition of the send list reception page 40 and the messages of other emails.

The desired send condition may be entered for each email when the send list is made. It may be configured that an acceptable range of fluctuation (a band of fluctuation) in an element value of an item in email substance information can be entered by a user when the send list is made. Examples of the acceptable range of fluctuation (band of fluctuation) include the maximum value in the band of fluctuation that is acceptable for the element value of each element, such as −100 yen or +1%, and the maximum number of elements that are subject to the fluctuation, such as one element or three elements. It may be configured that only element(s) that are assigned an acceptable band of fluctuation are set as element(s) assigned an acceptable fluctuation.

Subsequently, an "attach send list file" button on the send list reception page 40 is pressed, and then the storage location of a send list file containing a send list is specified. When a "submit" button on the send list reception page 40 is selected after the send list file is specified, the store terminal device 20 sends the send list file with a store name and a store ID to the information processing server 10.

Next, the information processing server 10 receives the send list information from the store (Step S2). Specifically, the system controller 14 receives the send list file with the store name and the store ID from the store terminal device 20.

After that, the information processing server 10 stores the send list information as pieces send candidate information (Step S3). Specifically, as shown in FIG. 3, based on the received send list file, the system controller 14 stores recipients such as email addresses, senders, pieces of email substance information, and desired send conditions, as the pieces of send candidate information in the email information DB 12d.

Instead of sending the send list, the store terminal device 20 may send, with the pieces of email substance information, specification information specifying a customer segment, such as a desired age group and gender of customers, as a desired send condition to the information processing server 10, and the information processing server 10 may generate a send list. Alternatively, the store may specify, for example, an item in the message of an email (an item in email substance information), and the information processing server 10 may identify a customer segment that is likely to purchase the item in the message of the email from a database (e.g., the history information DB 12*f*) and generate a send list.

3.2 Example of How Information Processing Server Sends Email

The following describes an example of how the information processing server sends an email with reference to FIGS. 12 to 15.

Figure 12:
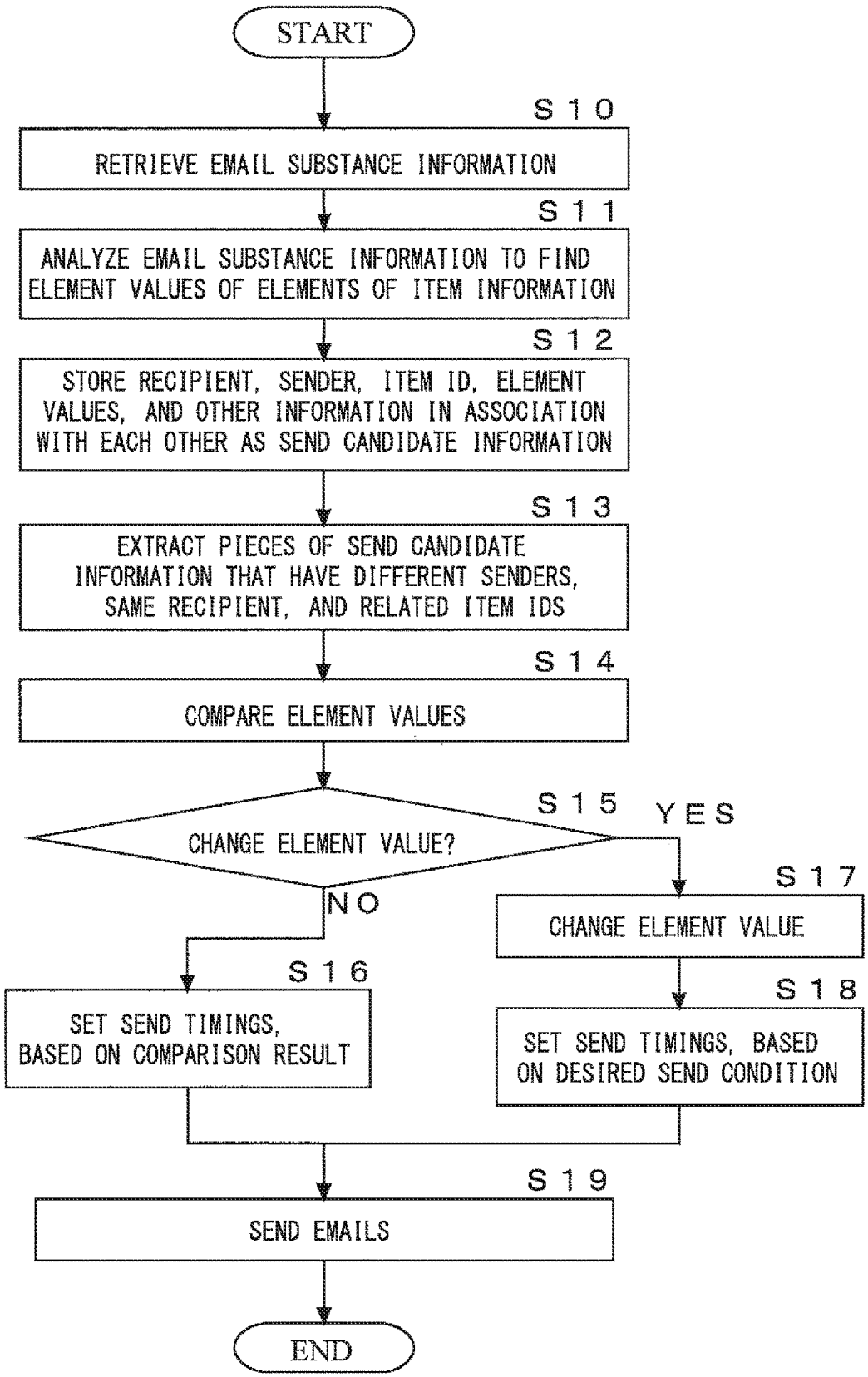
FIG. 12 is a flowchart showing an example of how the information processing server in FIG. 1 sends an email.
Figure 13:
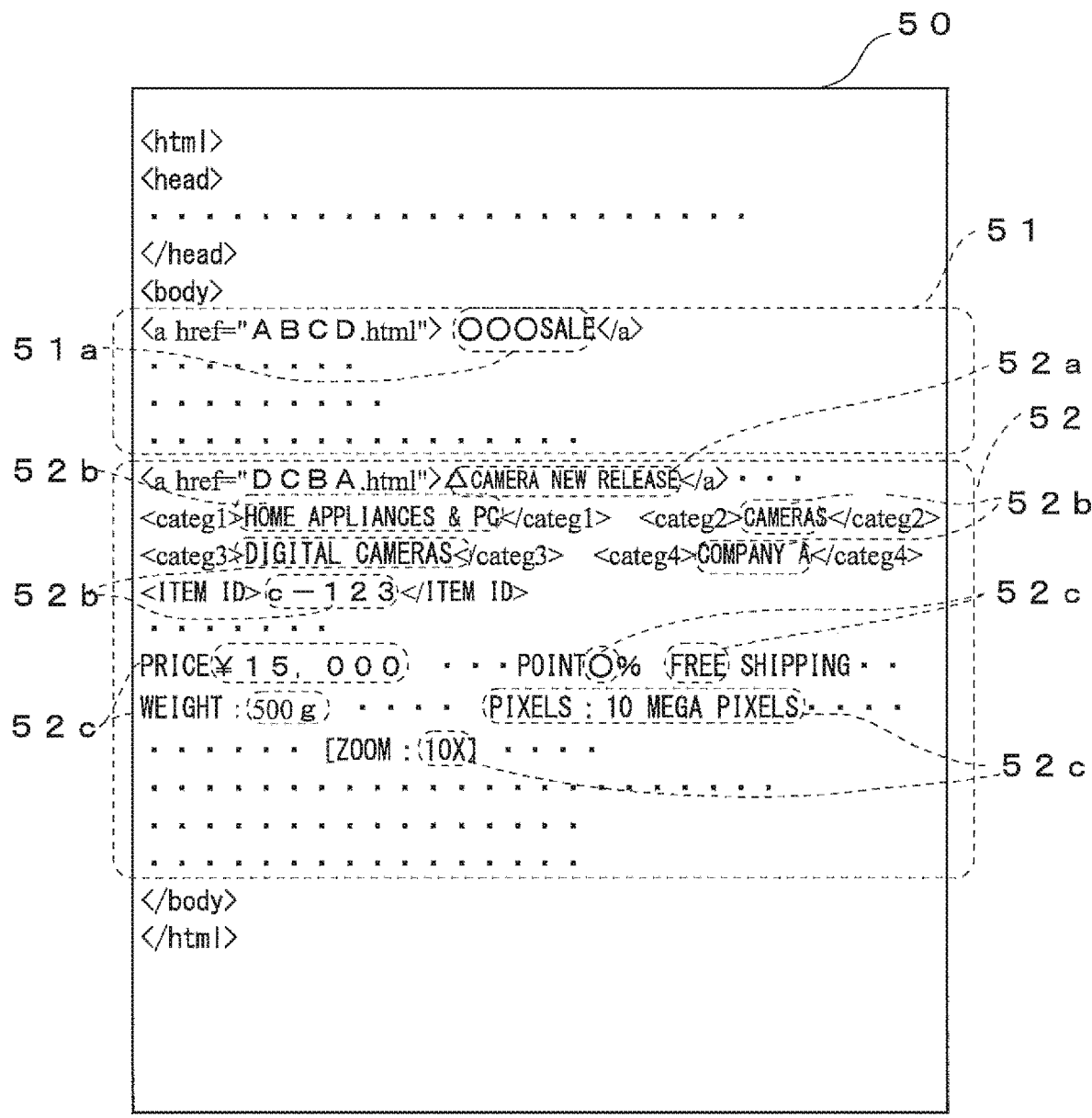
FIG. 13 is a schematic diagram showing an example of email substance information.
Figure 15:
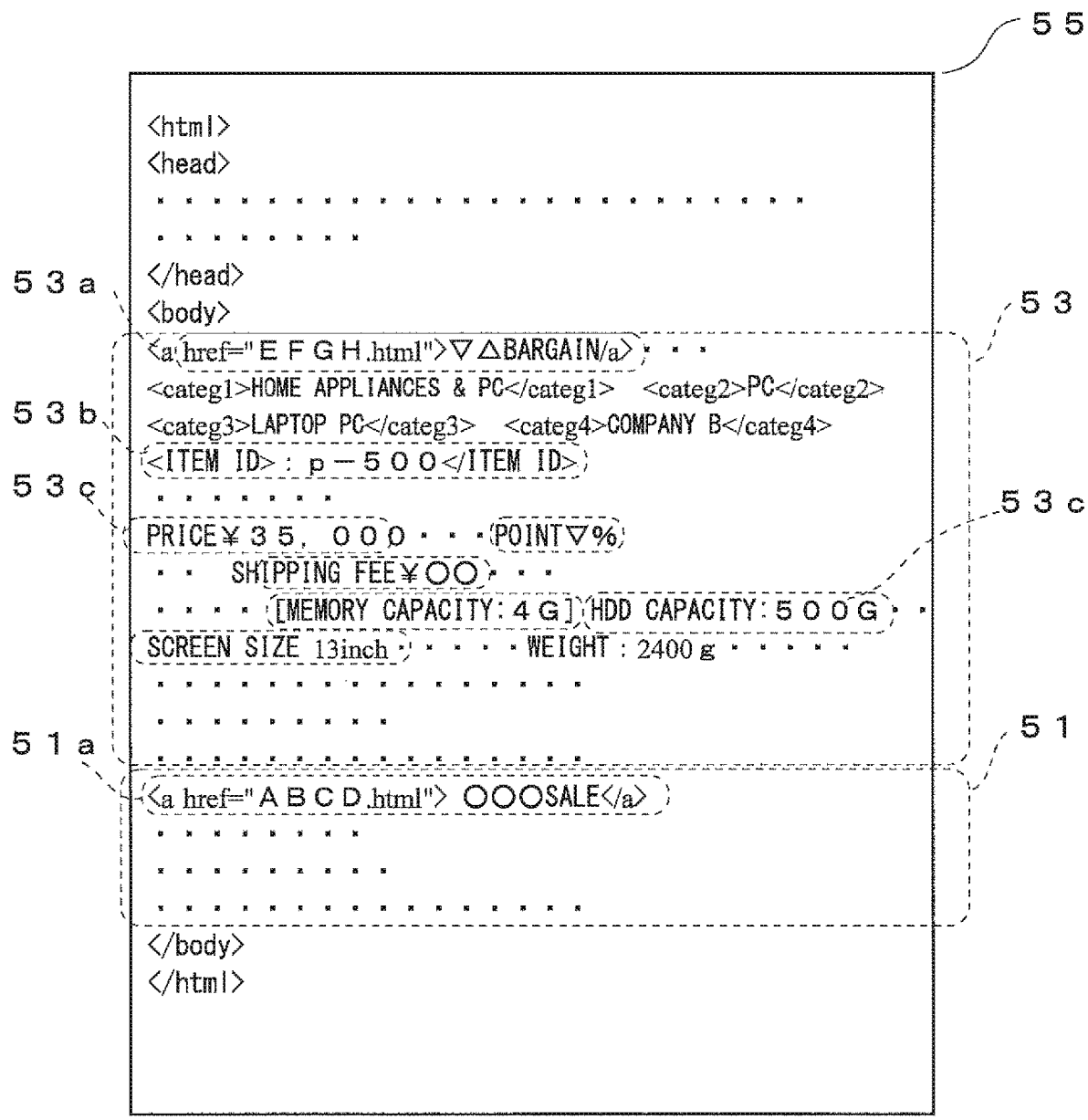
FIG. 15 is a schematic diagram showing an example of email substance information.

FIG. 12 is a flowchart showing an example of how the information processing server 10 sends an email. FIGS. 13 and 15 are each a schematic diagram showing an example of email substance information. FIG. 14 is a schematic diagram showing an example of email substance analysis information.

When a predetermined send condition is met, the information processing server 10 generates and sends an email in the information processing server 10. Examples of the predetermined send condition include that a desired sent time, which is a desired send condition included in the send list, has come, that a predetermined time, such as every other day or every other week, has come, and that the number of emails waiting to be sent (send candidate information) stored in the email information DB 12*d* exceeds a threshold value (an example of a second or third threshold value). The number of stored pieces of send candidate information may be the number of stored emails waiting to be sent for each recipient or the total number of emails waiting to be sent stored in the email information DB 12*d*.

The second threshold value is set based on the elapsed time since a sent time (e.g., the last sent time) at which an email was previously sent to recipient identification information (e.g., an email address), that is, the difference between the current time and a previous sent time. For example, the longer the elapsed time is, the higher the second threshold value is set. The shorter the elapsed time is, the lower the second threshold value is set. That is, the second threshold value is set so that timings to send emails are more likely to be dispersed when the elapsed time is short than when the elapsed time is long, even if the numbers of stored emails are the same. In other words, the second threshold value is set so that timings to send emails are more likely to be dispersed when the number of stored emails increases rapidly (when the rate of increase in the number of stored emails is high) than when the number of stored emails increases slowly (when the rate of increase in the number of stored emails is low), even if the number of stored emails are the same.

If the number of stored emails is less than the second threshold value when a desired sent time, which is a desired send condition included in the send list, has come, the information processing server 10 skips the following Steps S10 to S18 and sends the corresponding email to the email address of the recipient without modification.

The third threshold value is set based on the traffic on a communication line (e.g., the network 3). For example, the third threshold value is set low during high traffic hours of the communication line and is set high during low traffic hours of the communication line. That is, the third threshold value is set so that timings to send emails are more likely to be dispersed during the high traffic hours of the communication line than during the low traffic hours of the communication line, even if the numbers of stored emails are the same. The traffic on the communication line may be estimated from the number of accesses or a change in the number of accesses to a predetermined site. While the number of accesses to the predetermined site is greater than or equal to a first reference value, the corresponding hours may be determined to be high traffic hours of the communication line. While the number of accesses to the predetermined site is less than or equal to a second reference value, which is less than the first reference value, the corresponding hours may be determined to be low traffic hours of the communication line.

As shown in FIG. 12, the information processing server 10 retrieves email substance information (Step S10). Specifically, the system controller 14 of the information processing server 10 retrieves, from the email information DB 12*d*, email substance information yet to be analyzed. As shown in FIG. 13, the email substance information is written in a markup language, such as HTML.

Subsequently, the information processing server 10 analyzes the email substance information (Step S11). Specifically, the system controller 14 of the information processing server 10 analyzes the email substance information from the beginning, based on tag information of the markup language, text description patterns, or the like. For example, portions sandwiched between each pair of tags, such as "<a>"

"</a>", "<categ1>" "</categ1>", and "<item ID>"

"</item ID>", are extracted as item information 51*a*, 52*a*, and 52*b* of send candidate information.

Examples of the item information 51*a* and 52*a* extracted based on the tags "<a href= . . . >" "</a>" include the item information "OOO sale" and the item information "Δ camera new release".

Item categories are extracted based on the tags "<categ1>" "</categ1>", the tags "<categ2>" "</categ2>", the tags "<categ3>" "</categ3>", and the tags "<categ4>" "</categ4>". Examples of the item information 52*b* extracted based on the tags "<categ1>" "</categ1>" include the element value "home appliances & PCs" of the element "category 1". Examples of the item information 52*b* extracted based on the tags "<categ2>" "</categ2>" include the element value "cameras" of the element "category 2". The element value "digital cameras" of the element "category 3" of the item information 52*b* extracted based on the tags "<categ3>"

"</categ3>" is given. The element value "company A" of the element "category 4" of the item information 52*b* extracted based on the tags "<categ4>" "</categ4>" is given.

The item identification information of an item is extracted based on, for example, the tags <item ID>" "</item ID>". For example, the element value "c-123" of the item ID is an example of the item identification information.

The tags indicate elements, instructions, or the like in a text written in HTML. For example, the tags "<categ1>"

"</categ1>", <item ID>" "</item ID>", and the tags <item ID>" "</item ID>" are tags defined in an HTML header.

As with <a href= . . . ><span itemprop="title">home appliances & cameras</span></a>, item categories and item identification information may be extracted based on, for example, the tags "<a href= . . . ><span itemprop="title">

</span></a>". The information processing server 10 may determine whether word(s) indicating a category, such as "home appliances & cameras" or "cameras", are included in predetermined tags, such as the tags "<a href= . . . ><span itemprop="title"> </span></a>", to extract item categories or item identification information.

When item information of the send candidate information is extracted based on text description patterns, item information 52*c* may be extracted based on the description pattern "Price ¥ . . . " of the element "price", the description pattern "Point . . . %" of the element "points", the description pattern "Shipping Fee . . . " of the element "shipping fee", the description pattern "Weight: . . . g" of the element "weight", the description pattern "Pixels: . . . megapixels" of the element "the number of pixels", the description pattern "[Zoom: . . . x]" of the element "zoom", and the like. Examples of the item information 52*c* include the element value "15,000" the element value "O", the element value "free", the element value "500", the element value "1000", and the element value "10". Such description patterns may be prestored in a database. Alternatively, the description patterns may be generated, by the technique disclosed in Japanese Patent Application No. 2012-501906.

Here, for example, there is a hierarchy in pieces of item information of the send candidate information. Item information 51 including the item information 51*a* and item information 52 including the item, information 52*a*, 52*b*, and 52*c* are extracted. For example, based on the position of the item information 52*a*, the email substance information is divided into the item information 51 and 52, and then the item information 51 and 52 are extracted. The superordinate item information 51 and 52 may be generated from the subordinate item information 51*a*, 52*a*, 52*b*, and 52*c*.

When item prices, specifications, and the like in each store are prestored in the item information DB 12*a*, item information of the send candidate information may be retrieved from the item information DB 12*a*.

Subsequently, the information processing server 10 stores the recipient, the sender, the item ID, the element values, and other information in association with each other as send candidate information (Step S12). As shown in FIG. 14, the system controller 14 stores, as the extracted item information, an element value of the item ID, an element value of each category, element values related to price, element values related to item specifications, in the field of item information of each piece of send candidate information of the email information DB 12*d*. The item information 51 and 52 may also be stored as email substance analysis information in the field of item information of the send, candidate information of the email information DB 12*d*.

Steps S10 to S12 are performed, also for email substance information yet to be analyzed at this point (e.g., email substance information 55, as shown in FIG. 15).

Steps S10 to S12 may be performed in advance when the send list is received in Step S2.

In this manner, the information processing server 10 functions as an example of the send candidate information storage means. The send candidate information storage means stores a plurality of pieces of send candidate information. Each piece of send candidate information has sender identification information identifying the sender of an email, recipient identification information identifying a recipient of the email, item identification information, item information that are associated with each other. The item information includes element values of one or more elements.

Subsequently, the information processing server 10 extracts pieces of send candidate information that have different senders, the same recipient, and related item IDs (Step S13). Specifically, the system controller 14 extracts at least two or more pieces of send candidate information whose sent time, which is a desired send condition thereof, is within a predetermined range and that have different senders, the same recipient, and related item IDs, by referring to the email information DB 12*d*. The related item IDs are determined based on relational information indicating the relationship among items. The relational information may be items preset as related items in a relational information list or a relational information table or information about categories corresponding to each of the items. When the relational information is category information, items that belong to at least one or more same category, which correspond to each item, are determined to be related to each other. Examples of sent times within the predetermined range include sent times that belong to the same day or the same time period (e.g., the same one of the eight 3-hour periods into which 24 hours are divided), that are within 1 hour or 1 minute, or that are the same.

Extracted range for comparison (comparison range) include pieces of send candidate information that are waiting to be sent in the email information DB 12*d* and that have different senders, the same recipient, and related item IDs.

The information processing server 10 may determine whether to perform Step S13 and subsequent steps, based on the number of this extracted emails. For example, when the number of the extracted emails is greater than or equal to the threshold value (the second threshold value or the third threshold value), the number of emails that a user receives increases. Thus, if they were sent without modification, the emails would be more unlikely to be handled by the user to be buried, and the number of other emails that can be compared would increase in proportion to the increase in the number of emails sent at the same time, and accordingly the comparison would make the emails more unlikely to be handled by the user, than when the number of emails that the user receives is small. Therefore, Step S13 and subsequent steps are performed. When the number of the extracted emails is less than the threshold value (the second threshold value or the third threshold value), the number of emails that a user receives is small. Thus, the entails would be less unlikely to be handled by the user to be buried, and the number of other emails that can be compared would be reduced in proportion to the reduction in the number of emails sent at the same time, and accordingly the comparison would make the emails less unlikely to be handled by the user, than when the number of emails that the user receives is large. Therefore, Step 313 and subsequent steps are skipped.

In this manner, the information processing server 10 functions as an example of extracting means. The extracting means extracts, from among the stored pieces of send candidate information, two or more pieces of send candidate information that have different pieces of the sender identification information, the same recipient identification information, and related pieces of the item identification information. The information processing server 10 functions as an example of the extracting means that further extracts two or more pieces of send candidate information that have the same category to which the items corresponding to their pieces of item identification information belong.

Subsequently, the information processing server 10 compares element values (Step S14). Specifically, when the number of the extracted pieces of send candidate information is two, the system controller 14 compares the element values of each element between the pieces of item information of the two pieces of send candidate information (specifically, compares the element values to determine which element value is a superior element value and an inferior element value), by referring to the email information DB 12d. The system controller 14 then determines the send candidate information that has a larger number of superior element values, among the element values of all the elements, to be superior send candidate information, and determines the send candidate information that has a larger number of inferior element values, among the element values of all the elements, to be inferior send candidate information. When the number of the extracted pieces of send candidate information is greater than or equal to three, the system controller 14 compares the element value of each element in the item information of each extracted piece of send candidate information with the element values of all the other pieces of send, candidate information, determines the send candidate information that has the largest number of superior element values, among the element values of all the elements, to be superior send candidate information, and determines the other pieces of send candidate information to be inferior send candidate information. The system controller 14 may compare the element value of each element in the item information of each extracted piece of send candidate information with the element values of all the other pieces of send candidate information, determine the send candidate information that has the smallest number of superior element values, among the element values of all the elements, to be inferior send candidate information, and determine the other pieces of send candidate information to be superior send candidate information. In the determination, send, candidate information that has at least one or more element value is superior may be determined to be superior send candidate information.

Either when the number of the extracted pieces of send candidate information is two or when the number of, the extracted pieces of send candidate information is greater than or equal to three, the system controller 14 may calculate the difference between the element value of each element in the item information of each extracted piece of send candidate information and the reference element value of each element (e.g., the average of the corresponding element values of all items, the median of the corresponding element values of all items, and a corresponding element value of predetermined send candidate information) and compare the differences in each element value between the pieces of send candidate information.

At this point, whether the element value of each element is superior or inferior is determined based on a predetermined criterion preset for each element. For example, for "element: price", a lower price is determined to be superior, and a higher price is determined to be inferior. For the "element: the number of given points/rebate rate in points", a higher number of given points/rebate rate in points is determined to be superior, and a lower one is determined to be inferior. For example, for "element: shipping fee", a lower shipping fee is determined to be superior, and a higher shipping fee is determined to be inferior. For example, for "element: the number of pixels", a larger number of pixels are determined to be superior, and a smaller number of pixels are determined to be inferior. For "element: weight", less weight is determined to be superior, and more weight is determined to be inferior.

The system controller 14 may set only elements to which users attach importance as elements to be compared. The system controller 14 may weight the element value of each element using the weight for the element that is set in accordance with a recipient user and then make a comparison. For example, based on user information that this user attaches importance to price, user information that men tend to attach weight to item specifications, user information that people who purchase daily necessities tend to attach importance to price, and other information, the element value of each element is weighted and the comparison is made.

For example, the system controller 14 compares each element value of the item corresponding to item identification information included in an email, among a plurality of emails sent to the user A, that was handled by the user with each element value of the item corresponding to item identification information included in another email that was not handled by the user. The information processing server 10 then sets, for each user, the weights so that the weight(s) for the element(s) corresponding to element value(s), in which the item corresponding to the item identification information included in the email that was handled by the user is superior, is assigned a higher priority than the weights for the other elements. Then, the system controller 14 stores the set weights in association with the user ID in the weight information DB 12e.

The system controller 14 sums up the set weights according to user gender, age groups, and the like, by referring to the member information DB 12c using user IDs, and then sets the weight for each element based on user gender, age, and the like. Then, the system controller 14 stores the weights set based on user gender, age, and the like, in association with the user ID in the weight information DB 12e.

In this manner, the information processing server 10 functions as an example of send timing setting means that compares the element values of element(s), which correspond to the email recipient identification information, of each of the pieces of item identification information of the two or more extracted pieces of send candidate information.

The system controller 14 may set, for each category to which an item belongs, only elements to which importance is attached as elements to be compared. For example, for a category in which differences in price among items are small, importance is attached to item specifications more often than to price. For a category in which differences in specifications among items are small, importance is attached to price more often than to item specifications. The system controller 14 may weight the element value of each element using the weight for the element that is set in accordance with an item category and then make a comparison.

For example, the system controller 14 compares each element value of the item corresponding to item identification information included in an email, among a plurality of emails sent to the user A, that was handled by the user with each element value of the item, corresponding to item identification information included in another email that was not handled by the user. The information processing server 10 then sets, for each user, the weights so that the weight(s) for the element(s) corresponding to element value(s), in which the item corresponding to the item identification information included in the email that was handled by the user is superior, is assigned a higher priority than the weights for the other elements. Then, the system controller 14 stores the set weights in association with the item identification information (e.g., item ID or category ID) in the weight information DB 12e.

The system controller 14 sums up the set weights according to item identification information (e.g., item IDs or category IDs), by referring to the weight information DB 12e, and then sets the weight for each element based on, for example, item categories. Then, the system controller 14 stores the weights set based on, for example, item, categories in association with each item identification information (e.g., item ID or category ID) in the weight information DB 12e.

In this manner, the information processing server 10 functions as an example of the send timing setting means that compares the element values of element(s) corresponding to a category to which the items corresponding to the pieces of item identification information of the two or more extracted pieces of send candidate information belong.

The information processing server 10 may select certain send candidate information and compare the selected send candidate information with the other pieces of send candidate information stored in the email information DB 12d one by one.

Subsequently, after comparing each pair of element values (Step S14), the information processing server 10 determines whether to change the element value(s) of inferior element(s), among the elements of the send candidate information determined to be inferior (Step S15). Specifically, when an acceptable range of fluctuation is set as a desired send condition for an element that is among the elements of the send candidate information determined to be inferior in Step S14 and that is inferior to the corresponding element of the send candidate information to be compared, the system controller 14 determines to change the element value of the inferior element.

In the determination, the system controller 14 may determine to change the element value of the inferior element, only when the difference between the element value of the element of the send candidate information determined to be inferior and the element value of the corresponding element of the send candidate information to be compared or the corresponding reference element value is less than or equal to the acceptable range of fluctuation set as the desired send condition. If the send candidate information determined to be inferior has a plurality of elements, the system controller 14 may determine to preferentially change the element value of the element that has a smaller difference from the element value of the corresponding element of the send candidate information to be compared or the corresponding reference element value. The system controller 14 may determine to change the element values of all elements that are assigned acceptable ranges of fluctuation, among the element values of the elements of the send candidate information determined to be inferior, whether each of the element values is superior or inferior to the element value of the corresponding element of the send candidate information to be compared, or the corresponding reference element value.

The number of pieces of send candidate information whose element values are to be changed may be limited, the number of recipients of send candidate information, whose element value is to be changed may be limited, a limit may be set as a total acceptable range of fluctuation so that the total amount of prices changed by a sender (store) is less than or equal to a predetermined amount. If any of these limits is exceeded, the information processing server 10 determines to change no element value. These limited numbers and the limited amount are stored in the store information DB 12b. The acceptable range of fluctuation may be set based on information about all sales or history information of sales by email in the sender (store). Specifically, when the number of sales via a link included in the email is large, the acceptable range of fluctuation is set so that the total amount of changed prices is larger than that when the number of sales via a link included in the email is small.

This can prevent redundant changes. For example, when a store X sends emails to one hundred users, the emails received by the users may be different. Thus, assume that the emails are determined to be inferior to emails sent to eighty of the users at the same time. If the element values of all of the emails sent to the eighty users are changed (their prices are cut), the profit is significantly reduced (e.g., if the price per user is cut by \1,000, the profit falls by \80,000) Thus, the number of pieces of send candidate information whose element values are to be changed may be limited so that the reduction in the profit falls within an acceptable range. For example, when the total acceptable range of fluctuation is \40,000 and the price per user is cut by \1,000, the element value of the price is changed only for emails for forty users.

When it changes no element value (NO in Step S15), the information processing server 10 sets send timings, based on the result of the comparison between the element values (Step S16). Specifically, the system controller 14 retrieves the weight for each element from the email information DB 12d and determines whether a threshold value is exceeded, by using an equation for determining the difference of each element value from the corresponding reference value and the weights.

When the threshold value is exceeded, the system controller 14 sets the send timings different from the sent times that are desired send conditions. For example, the send timing is set a different day, a different time period, an hour later, or one minute later. They system controller 14 overwrites the value in the scheduled sent time field of the email information DB 12d. When the threshold value is not exceeded, the system controller 14 does not change the scheduled sent time.

If the number of the elements that are determined to be inferior when compared with the element value of each element of another piece of send candidate information is greater than or equal to a predetermined number, the send timing may be determined to be changed.

In this manner, the information processing server 10 functions as an example of the send timing setting means. The send timing setting means compares element values included in the pieces of item information of the two or more extracted pieces of send candidate information, and sets timings for sending emails corresponding to the two or more extracted pieces of send candidate information to at least two different timings, based on the result of the comparison.

When it changes an element value (YES in Step S15), the information processing server 10 changes the element value (Step S17). Specifically, the system controller 14 changes the element value of an inferior element within its acceptable range of fluctuation in the desired send condition so that the inferior element becomes a superior element. For example, the system controller 14 cuts the element price or increases the points until the element becomes superior to that in another email. Then, the system controller 14 changes the element value in the email substance information of the send candidate information whose element value is to be changed.

When there are a plurality of elements whose element values are inferior to the corresponding element values to be compared, the system controller 14 preferentially changes an element value that has a smaller difference from the corresponding element value to be compared. For example, when the element values of the price and the shipping fee are inferior to the corresponding element values to be compared, if the difference in the price is smaller than the difference in the shipping fee, the system controller 14 changes only the element value of the price so that the element value becomes superior. Alternatively, when the element values of the price, the shipping fee, and the points are inferior to the corresponding element values to be compared, the system controller 14 may make a comparison between the difference in the price, the difference in the shipping fee, and the difference in the number of points (the number of given points) and preferentially change the element value of an element whose difference is smaller.

Alternatively, when there are a plurality of elements whose element values are inferior to the corresponding element value to be compared, the system controller 14 refers to the history information DB 12*f* and preferentially changes a high-priority element value set based on at least one piece of the user information. (e.g., gender and age) and the history information (e.g., the history of sent emails and the history of user operations). For example, when the element values of the price and the shipping fee are inferior to the corresponding element values to be compared, if it is determined from the history information corresponding to the user identified by recipient identification information that the element to which the user attaches importance is the price, the system controller 14 changes only the element value of the price so that the element value becomes superior.

In this manner, the information processing server 10 functions as an example of the element value changing means. Based on the result of the comparison by the send timing setting means, the element value changing means changes the element value of at least one or more element included in the item information in some of the two or more extracted pieces of send candidate information. The information processing server 10 also functions as an example of the element value changing means that preferentially changes an element value that has a smaller difference from the corresponding element value, among a plurality of element values that are included in each of the pieces of item information and that are to be compared by the send timing setting means. The information processing server 10 also functions as an example of the element value changing means that changes the element value(s) of element(s) of high third priority. Each third priority is set based on at least one piece of the user information of the user corresponding to the recipient identification information and the history information of the user. The information processing server 10 functions as an example of the element value changing means that changes the element value(s) based on the set second priorities, among the elements included in each of the pieces of item information of the two or more extracted pieces of send candidate information.

Subsequently, the information processing server 10 sets send timings, based on the desired send condition (Step S18). That is, each scheduled sent time is set by default to, for example, a desired sent time included in the corresponding desired send condition. Thus, the system controller 14 does not change the value in the scheduled sent time field of the email information DB 12*d*. However, if the scheduled sent time (send timing) is determined to be changed based on the comparison between the changed element value and the element value of an element of the send candidate information to be compared or the reference element value, the system controller 14 changes the value in the scheduled sent time field of the email information DB 12*d*.

Subsequently, the information processing server 10 sends emails (Step S19). Specifically, after Steps S16 and S18, the system controller 14 sends emails each having the email substance information of the corresponding send candidate information to the email address of the recipient at the set send timing. For example, when many emails are sent to a user, the information processing server 10 sends the email relatively more valuable to a user (appealing to the user) at its send timing, which is a desired send condition thereof, and sends an email relatively less valuable to the user at a timing later than its send timing, thus preferentially sending the email relatively more valuable to the user.

As thus described, this embodiment can reduce the load on an email delivery system by dispersing emails at least two different timings, based on the emails' values determined by comparing the element values of element(s) in item information of send candidate information.

When, for example, many emails that apply a large load on the system are sent (many communication resources are used) this embodiment can preferentially send an email relatively more valuable to a user. That is, the information, processing server 10 sends an email relatively more valuable to the user at its send timing, which is a desired send condition thereof, and sends an email relatively less valuable to the user at a timing later than its send timing, thus preferentially sending the email relatively more valuable to the user.

The information processing server 10 extracts two or more pieces of send candidate information that have the same category to which the items corresponding to their pieces of item identification information belong, and compares the element values of element(s) corresponding to a category to which the items corresponding to the pieces of item identification information of the two or more extracted pieces of send candidate information belong.

In this case, comparing only the element values of the element(s) corresponding to the category to which the items belong can reduce the processing load of the system more than comparing the element values of all element.

The information processing server 10 also compares the element values of element(s), which correspond to email recipient identification information, of each piece of item identification information of the two or more extracted pieces of send candidate information.

In this case, preferentially comparing the element values of the element(s) that correspond to each recipient user can reduce the processing load of the system more than comparing the element values of all element.

The information processing server 10 also changes, among the element values of elements that are determined to be inferior when the two or more extracted pieces of send candidate information are compared, the element value of at least one or more element included in the item, information in some of the pieces of send candidate information.

In this case, changing the element value(s) of the element(s) inferior to those in another piece of send candidate information to be compared can improve the relative value of an email.

In addition, the information processing server 10 extracts two or more emails that have both the same recipient identification information and the same category to which the item corresponding to the item identification information belongs and whose difference between the current time and the sent time (stored in the email information DB 12*d*) at which the email including the send candidate information was sent to the recipient identification information is less than or equal to the threshold value. By referring to the history information. DB 12*f*, the information processing server 10 sets second priorities over each element on element value(s) to be changed, based on the element values included in the item, information in an email that was handled by the user corresponding to the recipient identification information and on the element values included in the item information in an email that was not handled by the user, among the extracted emails. The information processing server 10 then changes the element value(s) based on the set second priorities, among the elements included in each piece of item information of the two or more extracted pieces of send candidate information.

In this case, changing the element value(s) of the element(s) inferior to those in another piece of send candidate information to be compared using the priorities based on the user's operation history can further improve the values of emails.

Alternatively, the information processing server 10 preferentially changes an element value that has a smaller difference from the corresponding element value, among a plurality of element values to be compared that are included in each piece of item information.

In this case, among the element value(s) of the element(s) inferior to those in another piece of send candidate information to be compared, preferentially changing an element value that has a smaller difference from the corresponding element value in the other piece of send candidate information to be compared can reduce the amount of the change and further improve the values of emails.

Alternatively, the information processing server 10 changes the element value(s) of element(s) of high third priority. Each third priority is set based on at least one piece of the user information of the user corresponding to the recipient identification information and the history information of the user.

In this case, among the element(s) inferior to those in another piece of send candidate information to be compared, changing the element value(s) of high-priority element(s) based on at least one piece of the user information and the history information can effectively change the element value(s) of element(s) to which the user attaches importance and further improve the values of emails.

Emails whose element values are to be compared (comparison range) are not limited to emails waiting to be sent and may be emails that were sent for a previous certain period of time (an example of the difference between sent times that is less than or equal to a threshold value) and that have the same item category. For such two or more emails, the information processing server 10 sets the weight for each element, based on user histories of operations performed by the receivers of these emails, by referring to the history information DB 12*f*. That is, the information processing server 10 sets priorities (sets weights corresponding to the priorities) on element(s) to be compared based on the element values included in the item information in an email that was handled by a user and on the element values included in the item information in an email that was not handled by the user, by referring to the history information DB 12*f*. Then, the information processing server 10 compares the values of the element(s), based on the weights corresponding to the set priorities, among the elements included in each piece of item information of the two or more extracted pieces of send candidate information.

Examples of emails that were sent at the same time includes emails that were sent on the same day and emails that were sent within a predetermined period of time, such as within eight hours.

Including previous emails among the emails to be compared improves comparison accuracy. For example, the reason, is that emails previously sent may also be displayed together in a list of received, emails and thus be likely to be compared by the receiver.

The comparison range is extended by simultaneous or previous emails and is based on a user history of operations performed by the receiver of the emails. Thus, the values of emails are more appropriately evaluated. Accordingly, emails are dispersed based on more appropriate values of the emails.

In this manner, the information processing server 10 functions as an example of priority setting means. The priority setting means extracts two or more emails that have both the same recipient identification information and the same category to which the item corresponding to the item identification information belongs and whose difference between the sent time and the current time is less than or equal to the threshold value, and sets priorities on element(s) to be compared based on the element values included in the item information in an email that was handled by the user corresponding to the recipient identification information and on the element values included in the item information in an email that was not handled by the user, among the extracted emails. The information processing server 10 also functions as an example of the send timing setting means that compares the values of the element(s) based on the set priorities, among the elements included in each of the pieces of item information of the two or more extracted pieces of send candidate information.

Figure 16:
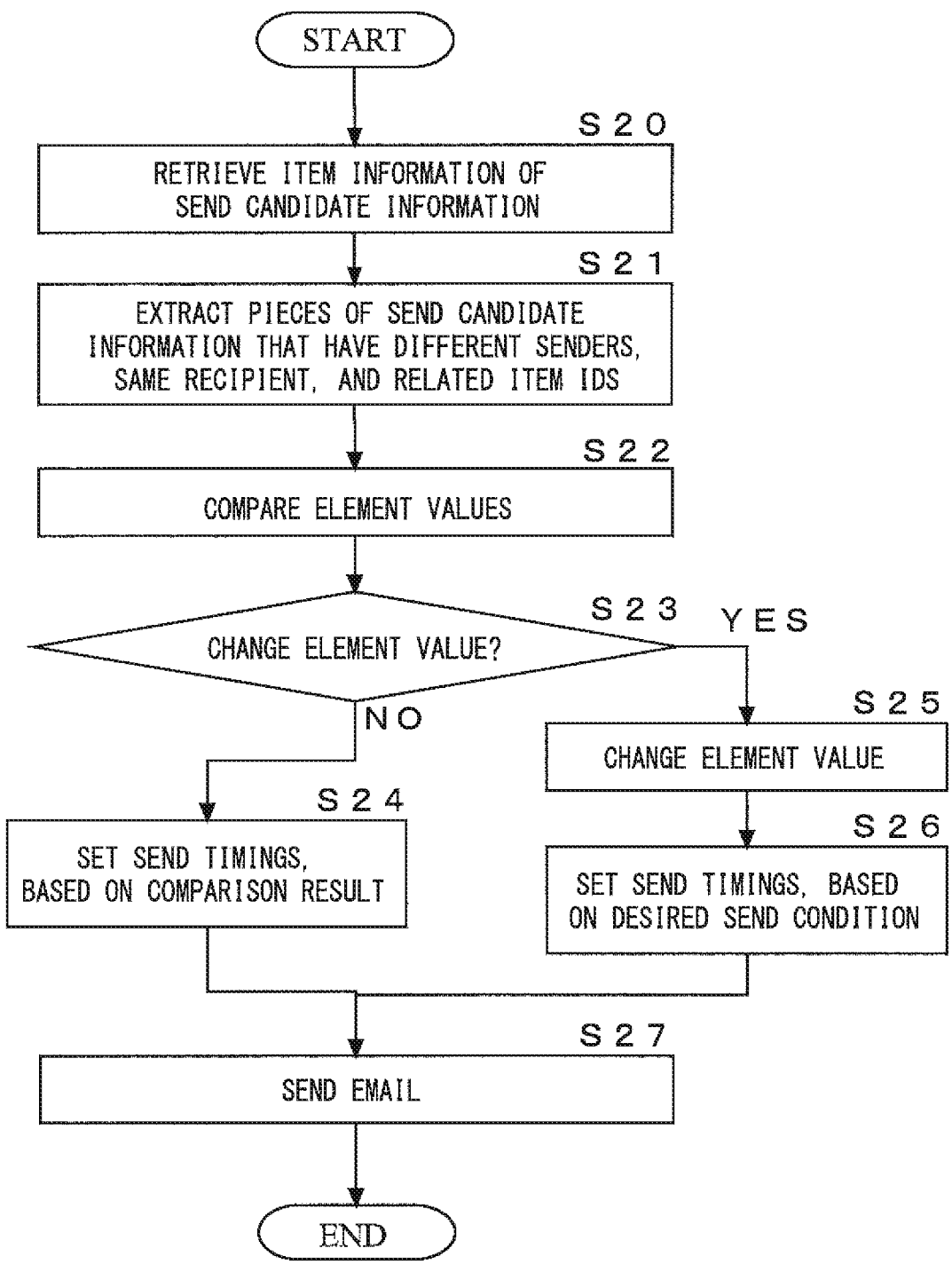
FIG. 16 is a flowchart showing a modification of how the information processing server in FIG. 1 receives send list information.

As shown in FIG. 16, Steps S11 and S12 (the process for analyzing the email substance information) may be skipped.

The information processing server 10 retrieves the item information of send candidate information from the email information DB 12*d* (Step S20). The information processing server 10 retrieves, from the email information DB 12*d*, the item information of stored send candidate information already analyzed.

Subsequently, as in Step S13 to S19, the information processing server 10 extracts pieces of send candidate information that have different senders, the same recipient, and related item IDs (Step S21), compares element values (Step S22), and determines whether to change the element, values (Step S23). The information processing server 10 sets a send timing, based on the comparison result (Step S24), or changes element value(s) and sets send timings (Steps S25 and S26). The information processing server 10 then sends emails (Step S27).

In addition, the present invention is not limited to the above embodiments. The above embodiments are merely examples. Any other embodiment that has essentially the same configuration and produces a similar effect as the technical ideas described in the claims of the present invention falls within the scope of the invention.

REFERENCE SIGNS LIST

1: email delivery system
3: network
10: information processing server (email-transmission setting device)
12: storage unit (send candidate information storage means)
12*d*: email information DB (send candidate information storage means)
12*e*: weight information DB
12*f*: history information DB
20: store terminal device
30: user terminal device (terminal device)
52*b*, 52*c*, 53*b*, 53*c*: item information

The invention claimed is:

1. An email-transmission setting device comprising:
   at least one non-transitory memory operable to store program code; and
   at least one processor operable to read said program code and operate as instructed by said program code, said program code comprising:
      send candidate information storage code configured to cause the at least one processor to store a plurality of pieces of send candidate information in a storage device, each piece of send candidate information corresponding to an email to be sent and having corresponding sender identification information identifying a sender of the email, recipient identification information identifying a recipient of the email, item identification information identifying an item described in the email, and item information including a category and element values of one or more elements that correspond to the item;
      identification code configured to cause the at least one processor to identify whether, from among the stored pieces of send candidate information, two or more pieces of send candidate information have different pieces of the sender identification information, the same recipient identification information, related pieces of the item identification information, and belong to the same category;
      extracting code configured to cause the at least one processor to, based on the identification code identifying the two or more pieces of send candidate information having different pieces of the sender identification information, the same recipient identification information, related pieces of the item identification information, and belonging to the same category, extract the two or more pieces of send candidate information;
      send timing setting code configured to cause the at least one processor to:
         access a weight information database that comprises a plurality of weight values, associated with a plurality of recipient identifiers and a plurality of elements;
         weight element values of an element corresponding to the same category to the pieces of item identification information of the two or more extracted pieces of send candidate information belong based on weight values of the plurality of weight values that correspond to the corresponding recipient;
         compare the weighted element values included in the pieces of item information of the two or more extracted pieces of send candidate information; and
         set timings for sending emails corresponding to the two or more extracted pieces of send candidate information to at least two different timings, based on a result of the comparison of the weighted element values; and
      communication code configured to cause the at least one processor to control the email-transmission setting device to respectively transmit the emails corresponding to the two or more extracted pieces of send candidate information to the corresponding recipient using the same recipient identification information at different times based on the at least two different timings.

2. The email-transmission setting device according to claim 1, wherein the send candidate information storage code is further configured to cause the at least one processor to store a sent time at which an email including the send candidate information was sent to the recipient identification information,
   wherein the program code further comprises priority setting code configured to cause the at least one processor to extract two or more emails that have both the same recipient identification information and the same category to which an item corresponding to the item identification information belongs and whose difference between the sent time and a current time is less than or equal to a threshold value, and set a priority on an element to be compared based on element values included in the item information in an email that was handled by a user corresponding to the recipient identification information and on element values included in the item information in an email that was not handled by the user, among the extracted emails, and
   wherein the send timing setting code is further configured to cause the at least one processor to compare values of an element based on the set priority, among elements included in each of the pieces of item information of the two or more extracted pieces of send candidate information.

3. The email-transmission setting device according to claim 1, wherein the program code further comprises element value changing code configured to cause the at least one processor to change an element value of at least one or more element included in the item information in some of the two or more extracted pieces of send candidate information, based on a result of comparison by the send timing setting code.

4. The email-transmission setting device according to claim 3, wherein the program code further comprises second priority setting code configured to cause the at least one processor to extract two or more emails that have both the same recipient identification information and the same category to which an item corresponding to the item identification information belongs and whose difference between a current time and a sent time at which an email including the send candidate information was sent to the recipient identification information is less than or equal to a threshold value, and set a second priority over each element on an element value to be changed by the element value changing code, based on element values included in the item information in an email that was handled by a user corresponding to the recipient identification information and on element values included in the item information in an email that was not handled by the user, among the extracted emails, and
   wherein the element value changing code is further configured to cause the at least one processor to change an element value based on the set second priority, among elements included in each of the pieces of item information of the two or more extracted pieces of send candidate information.

5. The email-transmission setting device according to claim 3, wherein the element value changing code is further configured to cause the at least one processor to preferentially change an element value that has a smaller difference from a corresponding element value, among a plurality of element values that are included in each of the pieces of item information and that are to be compared by the send timing setting code.

6. The email-transmission setting device according to claim 3, wherein the element value changing code is further configured to cause the at least one processor to change an element value of an element of high third priority, and the third priority is set based on at least one piece of user information of a user corresponding to the recipient identification information and history information of the user.

7. The email-transmission setting device according to claim 1, wherein the send candidate information storage code is further configured to cause the at least one processor to store a sent time at which an email including the send candidate information was sent to the recipient identification information,
wherein the program code further comprises priority setting code configured to cause the at least one processor to extract two or more emails that have both the same recipient identification information and the same category to which an item corresponding to the item identification information belongs and whose difference between the sent time and a current time is less than or equal to a threshold value, and set a priority on an element to be compared based on element values included in the item information in an email that was handled by a user corresponding to the recipient identification information and on element values included in the item information in an email that was not handled by the user, among the extracted emails, and
wherein the send timing setting code is further configured to cause the at least one processor to compare values of an element based on the set priority, among elements included in each of the pieces of item information of the two or more extracted pieces of send candidate information.

8. The email-transmission setting device according to claim 1, wherein the program code further comprises element value changing code configured to cause the at least one processor to change an element value of at least one or more element included in the item information in some of the two or more extracted pieces of send candidate information, based on a result of comparison by the send timing setting code.

9. The email-transmission setting device according to claim 2, wherein the program code further comprises element value changing code configured to cause the at least one processor to change an element value of at least one or more element included in the item information in some of the two or more extracted pieces of send candidate information, based on a result of comparison by the send timing setting code.

10. The email-transmission setting device according to claim 7, wherein the program code further comprises element value changing code configured to cause the at least one processor to change an element value of at least one or more element included in the item information in some of the two or more extracted pieces of send candidate information, based on a result of comparison by the send timing setting code.

11. The email-transmission setting device according to claim 8, wherein the program code further comprises second priority setting code configured to cause the at least one processor to extract two or more emails that have both the same recipient identification information and the same category to which an item corresponding to the item identification information belongs and whose difference between a current time and a sent time at which an email including the send candidate information was sent to the recipient identification information is less than or equal to a threshold value, and set a second priority over each element on an element value to be changed by the element value changing code, based on element values included in the item information in an email that was handled by a user corresponding to the recipient identification information and on element values included in the item information in an email that was not handled by the user, among the extracted emails, and
wherein the element value changing code is further configured to cause the at least one processor to change an element value based on the set second priority, among elements included in each of the pieces of item information of the two or more extracted pieces of send candidate information.

12. The email-transmission setting device according to claim 9, wherein the program code further comprises second priority setting code configured to cause the at least one processor to extract two or more emails that have both the same recipient identification information and the same category to which an item corresponding to the item identification information belongs and whose difference between a current time and a sent time at which an email including the send candidate information was sent to the recipient identification information is less than or equal to a threshold value, and set a second priority over each element on an element value to be changed by the element value changing code, based on element values included in the item information in an email that was handled by a user corresponding to the recipient identification information and on element values included in the item information in an email that was not handled by the user, among the extracted emails, and
wherein the element value changing code is further configured to cause the at least one processor to change an element value based on the set second priority, among elements included in each of the pieces of item information of the two or more extracted pieces of send candidate information.

13. The email-transmission setting device according to claim 10, wherein the program code further comprises second priority setting code configured to cause the at least one processor to extract two or more emails that have both the same recipient identification information and the same category to which an item corresponding to the item identification information belongs and whose difference between a current time and a sent time at which an email including the send candidate information was sent to the recipient identification information is less than or equal to a threshold value, and set a second priority over each element on an element value to be changed by the element value changing code, based on element values included in the item information in an email that was handled by a user corresponding to the recipient identification information and on element values included in the item information in an email that was not handled by the user, among the extracted emails, and
wherein the element value changing code is further configured to cause the at least one processor to change an element value based on the set second priority, among elements included in each of the pieces of item information of the two or more extracted pieces of send candidate information.

14. The email-transmission setting device according to claim 8, wherein the element value changing code is further configured to cause the at least one processor to preferentially change an element value that has a smaller difference from a corresponding element value, among a plurality of element values that are included in each of the pieces of item information and that are to be compared by the send timing setting code.

15. The email-transmission setting device according to claim 9, wherein the element value changing code is further configured to cause the at least one processor to preferentially change an element value that has a smaller difference from a corresponding element value, among a plurality of element values that are included in each of the pieces of item information and that are to be compared by the send timing setting code.

16. The email-transmission setting device according to claim 10, wherein the element value changing code is further configured to cause the at least one processor to preferentially change an element value that has a smaller difference from a corresponding element value, among a plurality of element values that are included in each of the pieces of item information and that are to be compared by the send timing setting code.

17. The email-transmission setting device according to claim 8, wherein the element value changing code is further configured to cause the at least one processor to change an element value of an element of high third priority, and the third priority is set based on at least one piece of user information of a user corresponding to the recipient identification information and history information of the user.

18. The email-transmission setting device according to claim 9, wherein the element value changing code is further configured to cause the at least one processor to change an element value of an element of high third priority, and the third priority is set based on at least one piece of user information of a user corresponding to the recipient identification information and history information of the user.

19. The email-transmission setting device according to claim 10, wherein the element value changing code is further configured to cause the at least one processor to change an element value of an element of high third priority, and the third priority is set based on at least one piece of user information of a user corresponding to the recipient identification information and history information of the user.

20. The email-transmission setting device according to claim 1, wherein the send candidate information storage code is further configured to cause the at least one processor to receive specification information specifying a customer segment and identify the plurality of pieces of send candidate information based on the specification information.

21. An email-transmission setting method comprising:
    storing a plurality of pieces of send candidate information, each piece of send candidate information corresponding to an email to be sent and having corresponding sender identification information identifying a sender of the email, recipient identification information identifying a recipient of the email, item identification information identifying an item described in the email, and item information including a category and element values of one or more elements that correspond to the item;
    identifying whether, from among the stored pieces of send candidate information, two or more pieces of send candidate information have different pieces of the sender identification information, the same recipient identification information, related pieces of the item identification information, and belong to the same category;
    extracting the two or more pieces of send candidate information based on identification of the two or more pieces of send candidate information having different pieces of the sender identification information, the same recipient identification information, related pieces of the item identification information, and belonging to the same category;
    accessing a weight information database that comprises a plurality of weight values, associated with a plurality of recipient identifiers and a plurality of elements;
    weighting element values of an element corresponding to the same category to the pieces of item identification information of the two or more extracted pieces of send candidate information belong based on weight values of the plurality of weight values that correspond to the corresponding recipient;
    comparing the weighted element values included in the pieces of item information of the two or more extracted pieces of send candidate information, and setting timings for sending emails corresponding to the two or more extracted pieces of send candidate information to at least two different timings, based on a result of the comparison of the weighted element values; and
    respectively transmitting the emails corresponding to the two or more extracted pieces of send candidate information to the corresponding recipient using the same recipient identification information at different times based on the at least two different timings.

* * * * *